United States Patent 
Kim et al.

(10) Patent No.: US 11,018,929 B2
(45) Date of Patent: May 25, 2021

(54) METHOD AND APPARATUS FOR TRANSMITTING UPLINK CHANNEL IN UNLICENSED BAND

(71) Applicant: KT CORPORATION, Gyeonggi-do (KR)

(72) Inventors: Ki-tae Kim, Seoul (KR); Kyujin Park, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 16/515,878

(22) Filed: Jul. 18, 2019

(65) Prior Publication Data

US 2020/0028740 A1    Jan. 23, 2020

(30) Foreign Application Priority Data

Jul. 20, 2018 (KR) .......................... 10-2018-0084747
May 22, 2019 (KR) .......................... 10-2019-0060113

(51) Int. Cl.
| | |
|---|---|
| H04L 12/24 | (2006.01) |
| H04W 72/08 | (2009.01) |
| H04W 72/04 | (2009.01) |
| H04L 5/00 | (2006.01) |
| H04W 16/14 | (2009.01) |
| H04L 12/26 | (2006.01) |
| H04W 72/12 | (2009.01) |

(52) U.S. Cl.
CPC ..... *H04L 41/0803* (2013.01); *H04W 72/0453* (2013.01); *H04W 72/085* (2013.01)

(58) Field of Classification Search
CPC . H04L 41/0803; H04L 5/0007; H04L 5/0092; H04L 5/0053; H04L 43/0876; H04L 41/0896; H04L 41/0806; H04L 5/001; H04L 5/0008; H04W 72/085; H04W 72/0453; H04W 16/14; H04W 72/044; H04W 72/1268
See application file for complete search history.

(56) References Cited

U.S. PATENT DOCUMENTS

| | | | | |
|---|---|---|---|---|
| 2019/0182015 | A1* | 6/2019 | Cui | ................... H04L 5/0094 |
| 2019/0342874 | A1* | 11/2019 | Davydov | .............. H04L 5/0094 |
| 2020/0137780 | A1* | 4/2020 | Kim | ................... H04L 5/0007 |
| 2020/0280426 | A1* | 9/2020 | Zhu | ....................... H04W 74/08 |

FOREIGN PATENT DOCUMENTS

WO    WO-2019120631 A1 *    6/2019

OTHER PUBLICATIONS

Ericsson, On Interlace Design for NR-U uplinks, 3GPP TSG-RAN WG1 Meeting #93, Busan, Korea, May 21-25, 2018, R1-1806259. (Year: 2018).*

* cited by examiner

*Primary Examiner* — Shailendra Kumar
(74) *Attorney, Agent, or Firm* — IP Legal Services, LLC

(57) ABSTRACT

Provided are a method and an apparatus for transmitting an uplink channel in an unlicensed band. The method includes configuring an interlace for an uplink channel based on interlacing information determined according to subcarrier spacing (SCS) of an unlicensed band; and transmitting the uplink channel by applying the interlace.

15 Claims, 18 Drawing Sheets

METHOD AND APPARATUS FOR TRANSMITTING UPLINK CHANNEL IN UNLICENSED BAND

CROSS REFERENCE TO RELATED APPLICATION

This application claims priority from Korean Patent Application Nos. 10-2018-0084747 & 10-2019-0060113, filed on Jul. 20, 2018 & May 22, 2019, which are hereby incorporated by reference for all purposes as if fully set forth herein.

BACKGROUND OF THE INVENTION

1. Field of the Invention

The embodiments are related to a method and an apparatus for transmitting an uplink channel in an unlicensed band in a next-generation radio access network (hereinafter, referred to as "NR (New Radio)").

2. Description of the Prior Art

Recently, $3^{rd}$ generation partnership project (3GPP) has approved a study item "Study on New Radio Access Technology" for studying next-generation radio access technology (i.e., 5G radio access technology). Based on this, design is under way on a frame structure, channel coding and modulation, waveform and multiple access schemes, and the like for NR (New Radio) in RAN WG1. NR is required to be designed in order to satisfy various QoS requirements necessary for subdivided and specific usage scenarios, as well as an improved data transmission rate, compared to LTE.

Representative usage scenarios of NR are eMBB (enhanced Mobile BroadBand), mMTC (massive Machine-Type Communication), and URLLC (Ultra Reliable and Low Latency Communication). It is required to design NR to have a flexible frame structure, compared to LTE, in order to satisfy requirements for each usage scenario.

Since the respective usage scenarios need different requirements for data rates, latency, reliability, coverage, and the like, there is a need for a method for efficiently multiplexing radio resource unit based on different numerologies {e.g., subcarrier spacing, subframes, TTIs (Transmission Time Intervals), etc.} in order to efficiently satisfying requirements for each scenario through frequency bands constituting an arbitrary NR system.

As one of the aspects above, it is necessary to design interlacing applicable to the transmission of an uplink channel using an unlicensed band in NR.

SUMMARY OF THE INVENTION

Embodiments of the present disclosure are related to a method and apparatus for transmitting an uplink channel on the basis of interlacing information determined according to subcarrier spacing in an unlicensed band.

In addition, embodiments of the present disclosure are related to a method and apparatus for instructing resource allocation on a subband basis in an unlicensed band.

According to embodiments, a method may be provided for transmitting an uplink channel by a User Equipment (UE) in an unlicensed band. The method may include: configuring an interlace for an uplink channel based on interlacing information determined according to subcarrier spacing (SCS) of an unlicensed band; and transmitting the uplink channel by applying the interlace.

According to another embodiment, a method may be provided for receiving an uplink channel by a base station in an unlicensed band. The method may include: receiving an uplink channel to which an interlace was applied in an unlicensed band; and obtaining information included in the uplink channel based on interlacing information about the interlace.

According to another embodiment, a User Equipment (UE) may be provided for transmitting an uplink channel in an unlicensed band. The UE may include: a controller configured to configure an interlace for an uplink channel based on interlacing information determined according to subcarrier spacing (SCS) of an unlicensed band; and a transmitter configured to transmit the uplink channel by applying the interlace.

According to another embodiment, a base station may be provided for receiving an uplink channel in an unlicensed band. The base station may include: a receiver configured to receive an uplink channel to which an interlace was applied in an unlicensed band; and a controller configured to obtain information included in the uplink channel based on interlacing information about the interlace.

According to the present embodiments, it is possible to provide a method and apparatus for transmitting an uplink channel on the basis of interlacing information determined according to subcarrier spacing in an unlicensed band.

In addition, according to the present embodiments, it is possible to provide a method and apparatus for instructing resource allocation on a subband basis in an unlicensed band.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EXEMPLARY EMBODIMENTS

Figure 1:
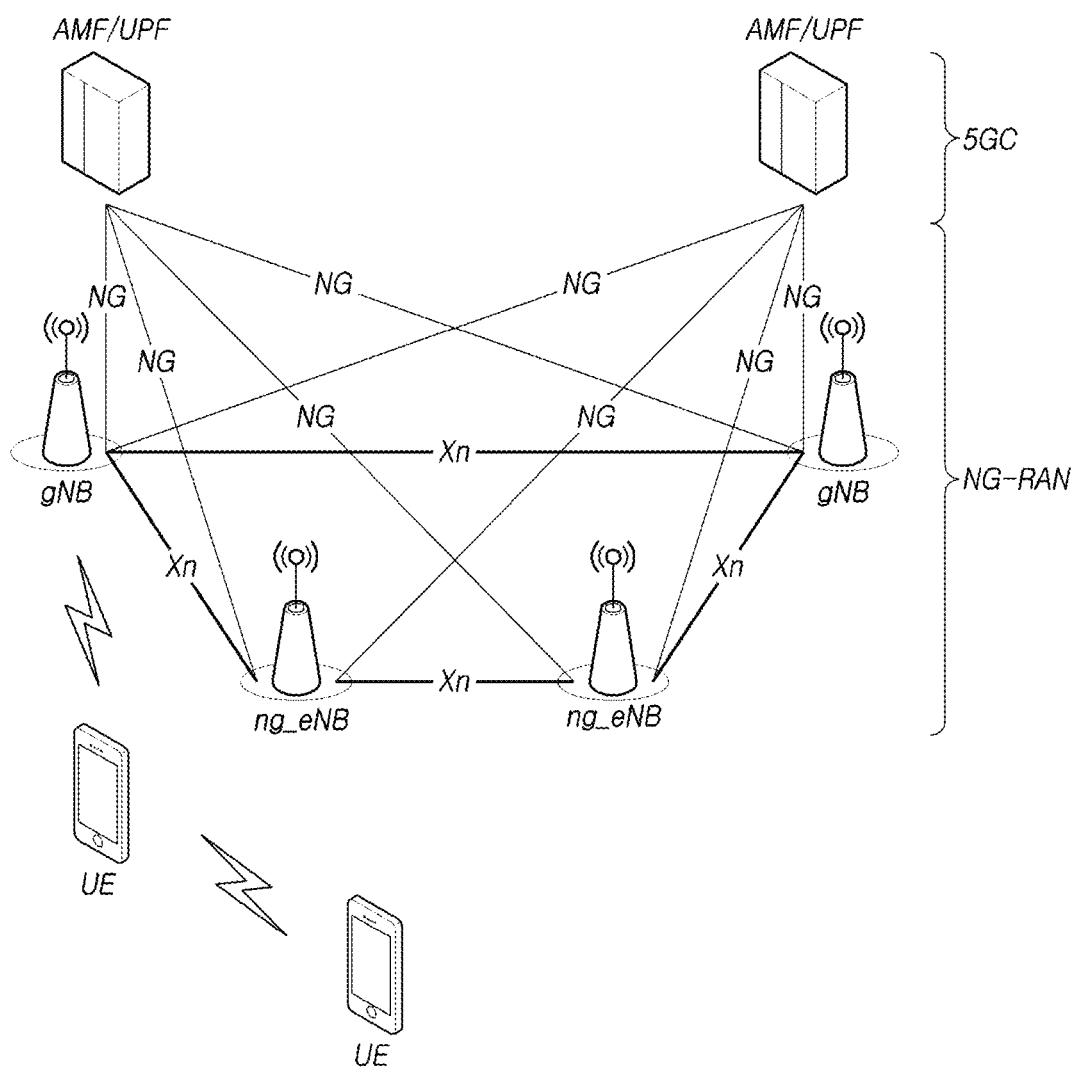
FIG. 1 is a view schematically illustrating a structure of an NR wireless communication system to which an embodiment is applicable.

Hereinafter, some embodiments of the present disclosure will be described in detail with reference to the accompanying illustrative drawings. In the drawings, like reference numerals are used to denote like elements throughout the drawings, even if they are shown on different drawings. Further, in the following description of the present disclosure, a detailed description of known functions and configurations incorporated herein will be omitted when it may make the subject matter of the present disclosure rather unclear. When the expression "include", "have", "comprise", or the like as mentioned herein is used, any other part may be added unless the expression "only" is used. When an element is expressed in the singular, the element may cover the plural form unless a special mention is explicitly made of the element.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s).

In describing the positional relationship between components, if two or more components are described as being "connected", "combined", or "coupled" to each other, it should be understood that two or more components may be directly "connected", "combined", or "coupled" to each other, and that two or more components may be "connected", "combined", or "coupled" to each other with another component "interposed" therebetween. In this case, another component may be included in at least one of the two or more components that are "connected", "combined", or "coupled" to each other.

In the description of a sequence of operating methods or manufacturing methods, for example, the expressions using "after", "subsequent to", "next", "before", and the like may also encompass the case in which operations or processes are performed discontinuously unless "immediately" or "directly" is used in the expression.

Numerical values for components or information corresponding thereto (e.g., levels or the like), which are mentioned herein, may be interpreted as including an error range caused by various factors (e.g., process factors, internal or external impacts, noise, etc.) even if an explicit description thereof is not provided.

A wireless communication system in the present specification refers to a system for providing various communication services, such as a voice service, a data service, and the like, using radio resources. Such a wireless communication system may include a User Equipment (UE), a base station, a core network, and the like.

The embodiments disclosed below may be applied to a wireless communication system using various radio access technologies. For example, the embodiments may be applied to various radio access technologies such as code division multiple access (CDMA), frequency division multiple access (FDMA), time division multiple access (TDMA), orthogonal frequency division multiple access (OFDMA), single-carrier frequency division multiple access (SC-FDMA), non-orthogonal multiple access (NOMA), or the like. In addition, the radio access technology may refer to respective generation communication technologies established by various communication organizations, such as 3GPP, 3GPP2, WiFi, Bluetooth, IEEE, ITU, or the like, as well as a specific access technology. For example, CDMA may be implemented as a wireless technology such as universal terrestrial radio access (UTRA) or CDMA2000. TDMA may be implemented as a wireless technology such as global system for mobile communications (GSM)/general packet radio service (GPRS)/enhanced data rates for GSM evolution (EDGE). OFDMA may be implemented as a wireless technology such as IEEE (Institute of Electrical and Electronics Engineers) 802.11 (Wi-Fi), IEEE 802.16 (WiMAX), IEEE 802-20, evolved UTRA (E-UTRA), and the like. IEEE 802.16m is evolution of IEEE 802.16e, which provides backward compatibility with systems based on IEEE 802.16e. UTRA is a part of a universal mobile telecommunications system (UMTS). 3GPP ($3^{rd}$-generation partnership project) LTE (long-term evolution) is a part of E-UMTS (evolved UMTS) using evolved-UMTS terrestrial radio access (E-UTRA), which adopts OFDMA in a downlink and SC-FDMA in an uplink. As described above, the embodiments may be applied to radio access technologies that have been launched or commercialized, and may be applied to radio access technologies that are being developed or will be developed in the future.

The UE used in the present specification must be interpreted as a broad meaning that indicates a device including a wireless communication module that communicates with a base station in a wireless communication system. The UE may be a user equipment (UE) in WCDMA, LTE, NR, HSPA, IMT-2020 (5G or New Radio), and the like, a mobile station in GSM, a user terminal (UT), a subscriber station (SS), a wireless device, and the like. In addition, the UE may be a portable user device, such as a smart phone, or may be a vehicle, a device including a wireless communication module in the vehicle, and the like in a V2X communication system according to the usage type thereof. In the case of a machine-type communication system, the UE may refer to an MTC terminal, an M2M terminal, or a URLLC terminal, which employs a communication module capable of performing machine-type communication.

A base station or a cell in the present specification refers to an end that communicates with a UE through a network and encompasses various coverage regions such as a Node-B, an evolved Node-B (eNB), a gNode-B, a low-power node (LPN), a sector, a site, various types of antennas, a base transceiver system (BTS), an access point, a point (e.g., a transmission point, a reception point, or a transmission/reception point), a relay node, a megacell, a macrocell, a microcell, a picocell, a femtocell, a remote radio head (RRH), a radio unit (RU), a small cell, and the like. In addition, the cell may be used as a meaning including a bandwidth part (BWP) in the frequency domain. For example, the serving cell may refer to an active BWP of a UE.

The various cells listed above are provided with a base station controlling one or more cells, and the base station may be interpreted as two meanings. The base station may be 1) a device for providing a megacell, a macrocell, a microcell, a picocell, a femtocell, or a small cell in connection with a wireless region, or may be 2) a wireless region itself. In the above description 1), the base station denotes the devices controlled by the same entity and providing predetermined wireless regions, or all devices interacting with each other and cooperatively providing a wireless region. A point, a transmission/reception point, a transmission point, a reception point, and the like are examples of the base stations according to the configuration method of the wireless region. In the above description 2), the base station denotes the wireless region in which a UE or a neighbour base station receives or transmits signals.

In this specification, the cell may refer to coverage of a signal transmitted from a transmission/reception point, a component carrier having coverage of a signal transmitted from a transmission/reception point (or a transmission point), or a transmission/reception point itself.

An uplink (UL) refers to a scheme of transmitting data from a UE to a base station, and a downlink (DL) refers to a scheme of transmitting data from a base station to a UE. The downlink may mean communication or communication paths from multiple transmission/reception points to a UE, and the uplink may mean communication or communication paths from a UE to multiple transmission/reception points. In the downlink, a transmitter may be a part of the multiple transmission/reception points, and a receiver may be a part of the UE. In addition, in the uplink, the transmitter may be a part of the UE, and the receiver may be a part of the multiple transmission/reception points.

The uplink and downlink transmit and receive control information through a control channel, such as a physical downlink control channel (PDCCH), a physical uplink control channel (PUCCH), and the like. The uplink and downlink transmit and receive data through a data channel such as a physical downlink shared channel (PDSCH), a physical uplink shared channel (PUSCH), or the like. Hereinafter, the transmission and reception of a signal through a channel, such as PUCCH, PUSCH, PDCCH, PDSCH, or the like, may be expressed as "PUCCH, PUSCH, PDCCH, PDSCH, or the like is transmitted and received".

For the sake of clarity, the following description will focus on 3GPP LTE/LTE-A/NR(New RAT) communication systems, but technical features of the disclosure are not limited to the corresponding communication systems.

3GPP has been developing a 5G ($5^{th}$-Generation) communication technology in order to meet the requirements of a next-generation radio access technology of ITU-R after studying 4G ($4^{th}$-generation) communication technology. Specifically, 3GPP is developing, as a 5G communication technology, LTE-A pro by improving the LTE-Advanced technology to conform to the requirements of ITU-R and a new NR communication technology that is totally different from 4G communication technology. LTE-A pro and NR all refer to the 5G communication technology. Hereinafter, the 5G communication technology will be described on the basis of NR unless a specific communication technology is specified.

Various operating scenarios have been defined in NR in consideration of satellites, automobiles, new verticals, and the like in the typical 4G LTE scenarios to support an enhanced mobile broadband (eMBB) scenario in terms of services, a massive machine-type communication (mMTC) scenario in which UEs spread over a broad region at a high UE density, thereby requiring low data rates and asynchronous connections, and an ultra-reliability and low-latency (URLLC) scenario that requires high responsiveness and reliability and supports high-speed mobility.

In order to satisfy such scenarios, NR introduces a wireless communication system employing a new waveform and frame structure technology, a low-latency technology, a super-high frequency band (mmWave) support technology, and a forward compatible provision technology. In particular, the NR system presents various technological changes in terms of flexibility in order to provide forward compatibility. The primary technical features of NR will be described below with reference to the drawings.

<Overview of NR System>

FIG. 1 is a view schematically illustrating a structure of an NR system to which an embodiment is applicable.

Referring to FIG. 1, the NR system is divided into a 5G core network (5GC) and an NR-RAN part. The NG-RAN includes gNBs and ng-eNBs providing user plane (SDAP/PDCP/RLC/MAC/PHY) and user equipment (UE) control plane (RRC) protocol ends. The gNBs or the gNB and the ng-eNB are connected to each other through Xn interfaces. The gNB and the ng-eNB are connected to the 5GC through NG interfaces, respectively. The 5GC may be configured to include an access and mobility management function (AMF) for managing a control plane, such as a UE connection and mobility control function, and a user plane function (UPF) controlling user data. NR supports both frequency bands below 6 GHz (frequency range 1:FR1) and frequency bands equal to or greater than 6 GHz (frequency range 2:FR2).

The gNB denotes a base station that provides a UE with an NR user plane and control plane protocol end, and the ng-eNB denotes a base station that provides a UE with an E-UTRA user plane and control plane protocol end. The base station described in the present specification should be understood as encompassing the gNB and the ng-eNB, and may be used to refer to the gNB or the ng-eNB separately from each other, as necessary.

<NR Waveform, Numerology, and Frame Structure>

NR uses a CP-OFDM waveform using a cyclic prefix for downlink transmission and uses CP-OFDM or DFT-s-OFDM for uplink transmission. OFDM technology is easy to combine with a multiple-input multiple-output (MIMO) scheme and allows a low-complexity receiver to be used with high frequency efficiency.

Since the three scenarios described above have different requirements for data rates, delay rates, coverage, and the like from each other in NR, it is necessary to efficiently satisfy the requirements for each scenario through frequency bands constituting the NR system. To this end, a technique for efficiently multiplexing radio resources based on a plurality of different numerologies has been proposed.

Specifically, the NR transmission numerology is determined on the basis of subcarrier spacing and a cyclic prefix (CP), and, as shown in Table 1 below, "$\mu$" is used as an exponential value of 2 to be changed exponentially on the basis of 15 kHz.

TABLE 1

| $\mu$ | Subcarrier spacing | Cyclic prefix | Supported for data | Supported for synch |
|---|---|---|---|---|
| 0 | 15 | Normal | Yes | Yes |

TABLE 1-continued

| μ | Subcarrier spacing | Cyclic prefix | Supported for data | Supported for synch |
|---|---|---|---|---|
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Figure 2:
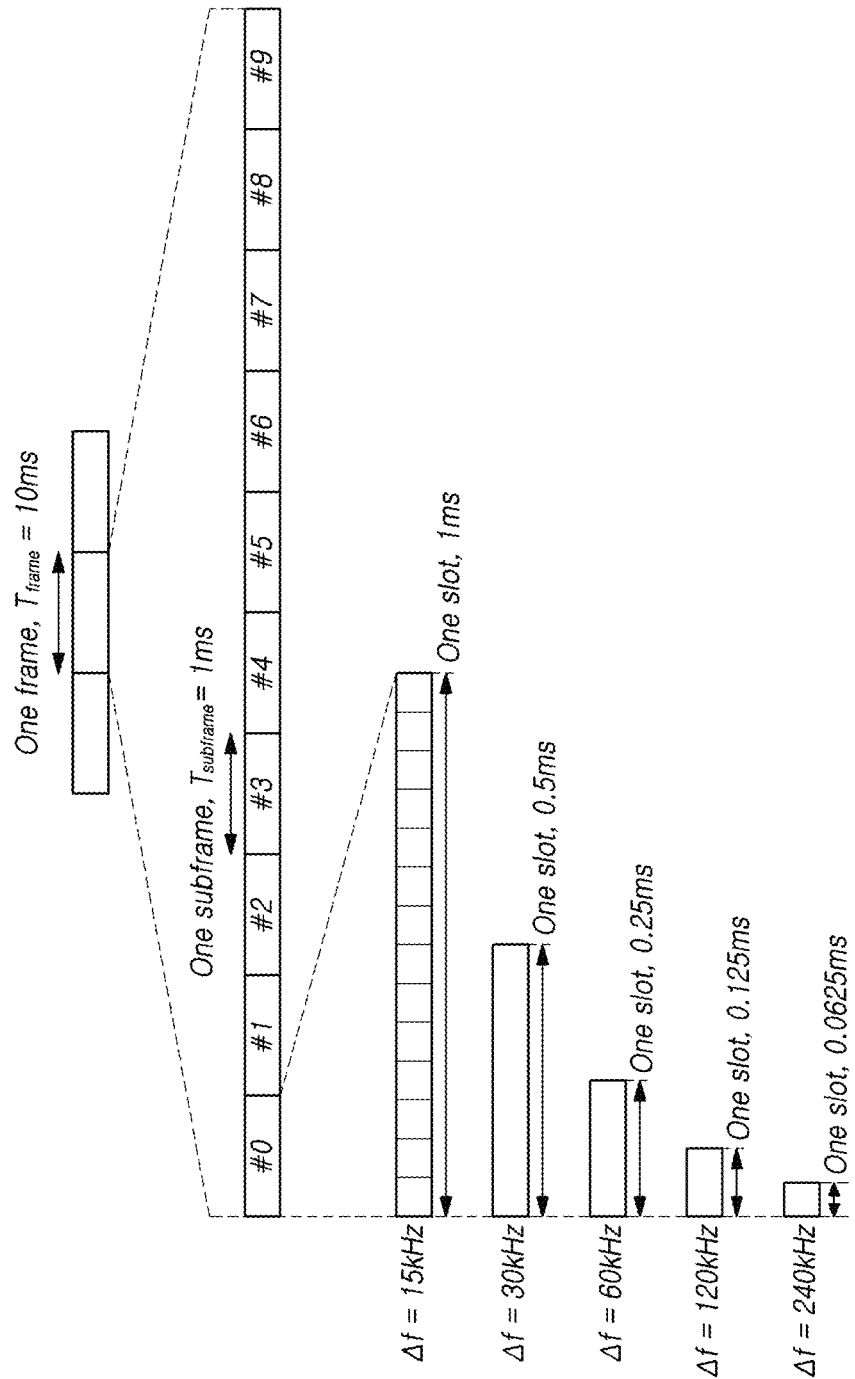
FIG. 2 is a view for explaining a frame structure in an NR system to which an embodiment is applicable.

As shown in Table 1 above, NR may have five types of numerologies according to subcarrier spacing. This is different from LTE, which is one of the 4G-communication technologies, in which the subcarrier spacing is fixed to 15 kHz. Specifically, in NR, subcarrier spacing used for data transmission is 15, 30, 60, or 120 kHz, and subcarrier spacing used for synchronization signal transmission is 15, 30, 12, or 240 kHz. In addition, an extended CP is applied only to the subcarrier spacing of 60 kHz. A frame includes 10 subframes each having the same length of 1 ms and has a length of 10 ms, which are defined in the frame structure in NR. One frame may be divided into half frames of 5 ms, and each half frame includes 5 subframes. In the case of a subcarrier spacing of 15 kHz, one subframe includes one slot, and each slot includes 14 OFDM symbols. FIG. 2 is a view for explaining a frame structure in an NR system to which an embodiment may be applied.

Referring to FIG. 2, a slot includes 14 OFDM symbols, which are fixed, in the case of a normal CP, but the length of the slot in the time domain may be varied depending on subcarrier spacing. For example, in the case of a numerology having a subcarrier spacing of 15 kHz, the slot is configured to have the same length of 1 ms as that of the subframe. On the other hand, in the case of a numerology having a subcarrier spacing of 30 kHz, the slot includes 14 OFDM symbols, but one subframe may include two slots each having a length of 0.5 ms. That is, the subframe and the frame may be defined using a fixed time length, and the slot may be defined as the number of symbols such that the time length thereof is varied depending on the subcarrier spacing.

NR defines a basic unit of scheduling as a slot and also introduces a minislot (or a subslot or a non-slot-based schedule) in order to reduce a transmission delay of a radio section. If wide subcarrier spacing is used, the length of one slot is shortened in inverse proportion thereto, thereby reducing a transmission delay in the radio section. A minislot (or subslot) is intended to efficiently support URLLC scenarios, and such a minislot may be scheduled in 2, 4, or 7 symbol units.

In addition, unlike LTE, NR defines uplink and downlink resource allocation as a symbol level in one slot. In order to reduce a HARQ delay, the slot structure capable of directly transmitting HARQ ACK/NACK in a transmission slot has been defined, and such a slot structure is referred to as a "self-contained structure", which will be described.

NR was designed to support a total of 256 slot formats, and 62 slot formats thereof are used in 3GPP Rel-15. In addition, NR supports a common frame structure constituting an FDD or TDD frame through combinations of various slots. For example, NR supports i) a slot structure in which all symbols of a slot are configured for a downlink, ii) a slot structure in which all symbols are configured for an uplink, and iii) a slot structure in which downlink symbols and uplink symbols are mixed. In addition, NR supports data transmission that is scheduled to be distributed to one or more slots. Accordingly, the base station may inform the UE of whether the slot is a downlink slot, an uplink slot, or a flexible slot using a slot format indicator (SFI). The base station may instructing a slot format by providing, using the SFI, the index of a table configured through UE-specific RRC signalling. The base station may dynamically instruct the slot format through downlink control information (DCI), or the base station may statically or quasi-statically instruct the same through RRC signaling.

<Physical Resources of NR>

As physical resources in NR, antenna ports, resource grids, resource elements, resource blocks, bandwidth parts, and the like are taken into consideration.

The antenna port is defined to infer one channel carrying a symbol on an antenna port from the other channel carrying another symbol on the same antenna port. If large-scale properties of a channel carrying na symbol on an antenna port may be inferred from the other channel carrying a symbol on another antenna port, the two antenna ports may have a quasi-co-located or quasi-co-location (QC/QCL) relationship. The large-scale properties include at least one of delay spread, Doppler spread, a frequency shift, an average received power, and a received timing.

Figure 3:
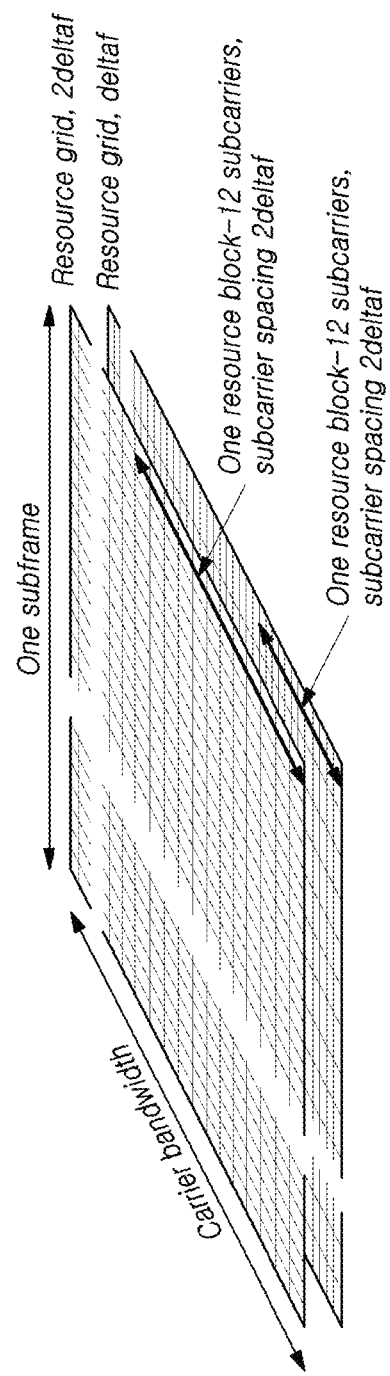
FIG. 3 is a view for explaining resource grids supported by a radio access technology to which an embodiment is applicable.

FIG. 3 is a view for explaining resource grids supported by a radio access technology to which the embodiment is applicable.

Referring to FIG. 3, resource grids may exist according to respective numerologies because NR supports a plurality of numerologies in the same carrier. In addition, the resource grids may exist depending on antenna ports, subcarrier spacing, and transmission directions.

A resource block includes 12 subcarriers and is defined only in the frequency domain. In addition, a resource element includes one OFDM symbol and one subcarrier. Therefore, as shown in FIG. 3, the size of one resource block may be varied according to the subcarrier spacing. Further, "Point A" that acts as a common reference point for the resource block grids, a common resource block, and a virtual resource block are defined in NR.

Figure 4:
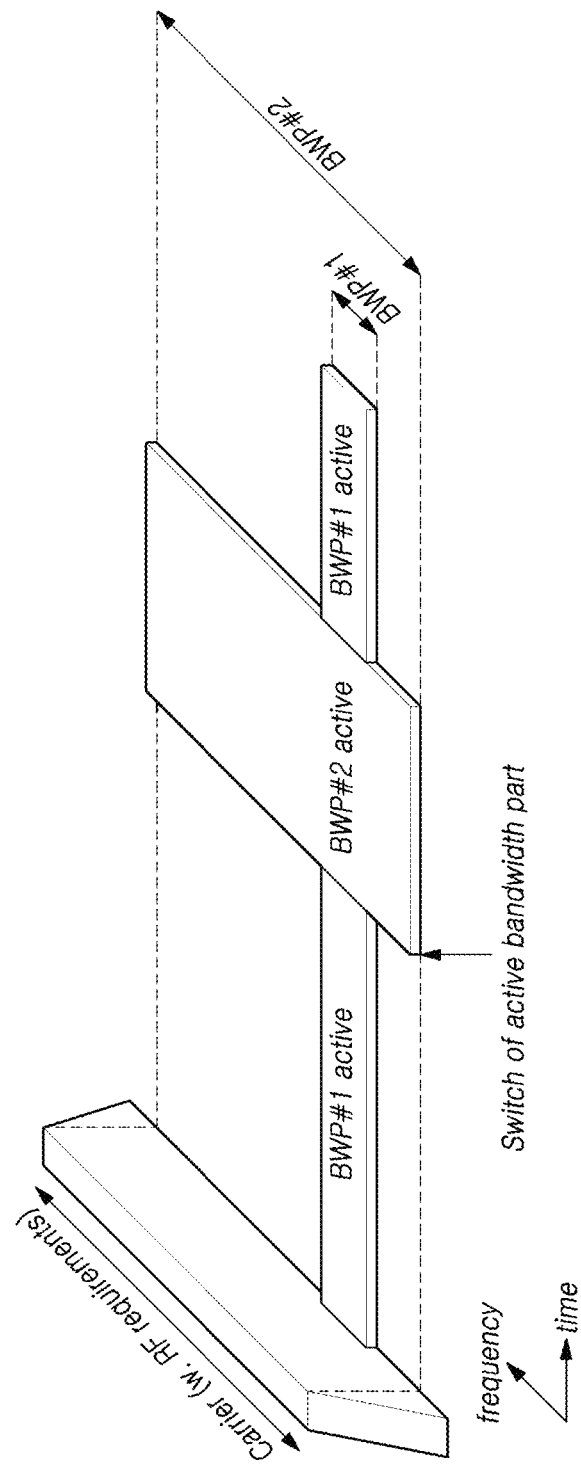
FIG. 4 is a view for explaining bandwidth parts supported by a radio access technology to which an embodiment is applicable.

FIG. 4 is a view for explaining bandwidth parts supported by a radio access technology to which the embodiment is applicable.

Unlike LTE in which the carrier bandwidth is fixed to 20 MHz, the maximum carrier bandwidth is configured as 50 MHz to 400 MHz depending on the subcarrier spacing in NR. Therefore, it is not assumed that all UEs use the entire carrier bandwidth. Accordingly, as shown in FIG. 4, bandwidth parts (BWPs) may be specified within the carrier bandwidth in NR so that the UE may use the same. In addition, the bandwidth part may be associated with one numerology, may include a subset of consecutive common resource blocks, and may be activated dynamically over time. The UE has up to four bandwidth parts in each of the uplink and the downlink, and the UE transmits and receives data using an activated bandwidth part during a given time.

In the case of a paired spectrum, uplink and downlink bandwidth parts are configured independently. In the case of an unpaired spectrum, in order to prevent unnecessary frequency re-tuning between a downlink operation and an uplink operation, the downlink bandwidth part and the uplink bandwidth part are configured in pairs to share a center frequency.

<Initial Access in NR>

In NR, a UE performs a cell search and a random access procedure in order to access and communicates with a base station.

The cell search is a procedure of the UE for synchronizing with a cell of a corresponding base station using a synchronization signal block (SSB) transmitted from the base station and acquiring a physical-layer cell ID and system information.

Figure 5:
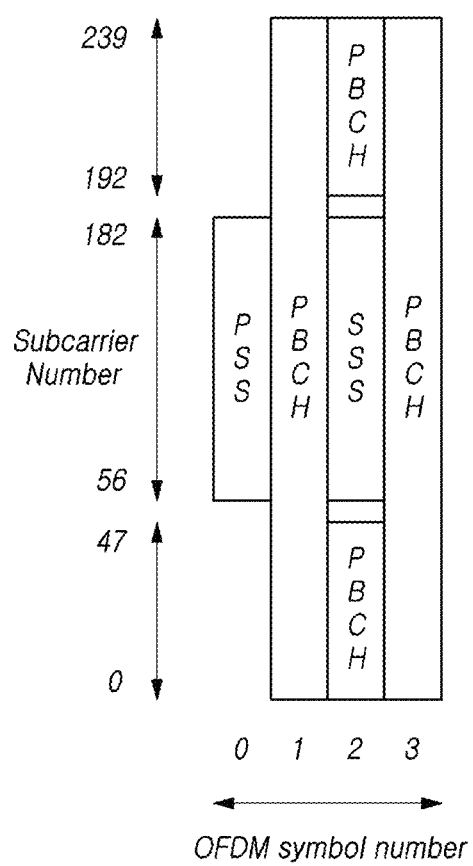
FIG. 5 is a view illustrating an example of a synchronization signal block in a radio access technology to an embodiment is applicable.

FIG. 5 is a view illustrating an example of a synchronization signal block in a radio access technology to which the embodiment is applicable.

Referring to FIG. 5, the SSB includes a primary synchronization signal (PSS) and a secondary synchronization signal (SSS), which occupy one symbol and 127 subcarriers, and PBCHs spanning three OFDM symbols and 240 subcarriers.

The UE monitors the SSB in the time and frequency domain, thereby receiving the SSB.

The SSB may be transmitted up to 64 times for 5 ms. A plurality of SSBs are transmitted by different transmission beams within a time of 5 ms, and the UE performs detection on the assumption that the SSB is transmitted every 20 ms based on a specific beam used for transmission. The number of beams that can be used for SSB transmission within 5 ms may be increased as the frequency band is increased. For example, up to 4 SSB beams may be transmitted at a frequency band of 3 GHz or less, and up to 8 SSB beams may be transmitted at a frequency band of 3 to 6 GHz. In addition, the SSBs may be transmitted using up to 64 different beams at a frequency band of 6 GHz or more.

One slot includes two SSBs, and a start symbol and the number of repetitions in the slot are determined according to subcarrier spacing as follows.

Unlike the SS in the typical LTE system, the SSB is not transmitted at the center frequency of a carrier bandwidth. That is, the SSB may also be transmitted at the frequency other than the center of the system band, and a plurality of SSBs may be transmitted in the frequency domain in the case of supporting a broadband operation. Accordingly, the UE monitors the SSB using a synchronization raster, which is a candidate frequency position for monitoring the SSB. A carrier raster and a synchronization raster, which are the center frequency position information of the channel for the initial connection, were newly defined in NR, and the synchronization raster may support a fast SSB search of the UE because the frequency spacing thereof is configured to be wider than that of the carrier raster.

The UE may acquire an MIB through the PBCH of the SSB. The MIB (master information block) includes minimum information for the UE to receive remaining minimum system information (RMSI) broadcast by the network. In addition, the PBCH may include information on the position of the first DM-RS symbol in the time domain, information for the UE to monitor SIB1 (e.g., SIB1 numerology information, information related to SIB1 CORESET, search space information, PDCCH-related parameter information, etc.), offset information between the common resource block and the SSB (the position of an absolute SSB in the carrier is transmitted via SIB1), and the like. The SIB1 numerology information is also applied to some messages used in the random access procedure for the UE to access the base station after completing the cell search procedure. For example, the numerology information of SIB1 may be applied to at least one of the messages 1 to 4 for the random access procedure.

The RMSI may mean SIB1 (system information block 1), and SIB1 is broadcast periodically (e.g., 160 ms) in the cell. SIB1 includes information necessary for the UE to perform the initial random access procedure, and is periodically transmitted through a PDSCH. In order to receive SIB1, the UE must receive numerology information used for the SIB1 transmission and the CORESET (control resource set) information used for scheduling of SIB1 through a PBCH. The UE identifies scheduling information for SIB1 using SI-RNTI in the CORESET, and acquires SIB1 on the PDSCH according to scheduling information. The remaining SIBs other than SIB1 may be periodically transmitted, or the remaining may be transmitted according to the request of the UE.

Figure 6:
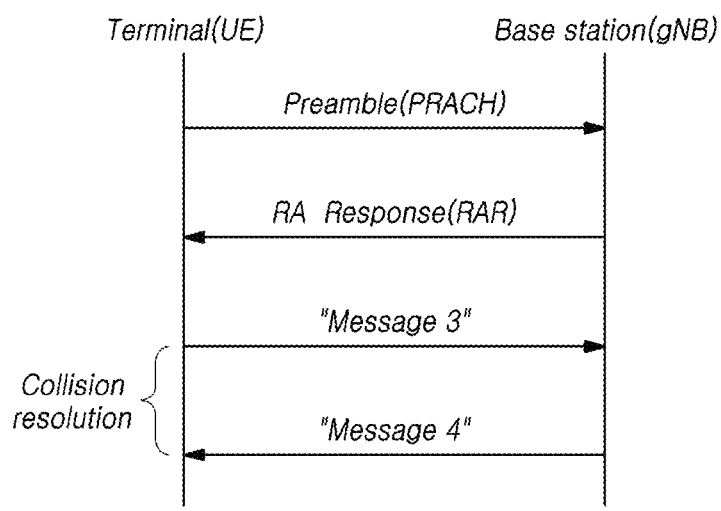
FIG. 6 is a view for explaining a random access procedure in a radio access technology to which an embodiment is applicable.

FIG. 6 is a view for explaining a random access procedure in a radio access technology to which the embodiment is applicable.

Referring to FIG. 6, if a cell search is completed, the UE transmits a random access preamble for random access to the base station. The random access preamble is transmitted through a PRACH. Specifically, the random access preamble is periodically transmitted to the base station through the PRACH that includes consecutive radio resources in a specific slot repeated. In general, a contention-based random access procedure is performed when the UE makes initial access to a cell, and a non-contention-based random access procedure is performed when the UE performs random access for beam failure recovery (BFR).

The UE receives a random access response to the transmitted random access preamble. The random access response may include a random access preamble identifier (ID), UL Grant (uplink radio resource), a temporary C-RNTI (temporary cell-radio network temporary identifier), and a TAC (time alignment command). Since one random access response may include random access response information for one or more UEs, the random access preamble identifier may be included in order to indicate the UE for which the included UL Grant, temporary C-RNTI, and TAC are valid. The random access preamble identifier may be an identifier of the random access preamble received by the base station. The TAC may be included as information for the UE to adjust uplink synchronization. The random access response may be indicated by a random access identifier on the PDCCH, i.e., a random access-radio network temporary identifier (RA-RNTI).

Upon receiving a valid random access response, the UE processes information included in the random access response and performs scheduled transmission to the base station. For example, the UE applies the TAC and stores the temporary C-RNTI. In addition, the UE transmits, to the base station, data stored in the buffer of the UE or newly generated data using the UL Grant. In this case, information for identifying the UE must be included in the data.

Lastly, the UE receives a downlink message to resolve the contention.

<NR CORESET>

The downlink control channel in NR is transmitted in a CORESET (control resource set) having a length of 1 to 3 symbols, and the downlink control channel transmits uplink/downlink scheduling information, an SFI (slot format index), TPC (transmit power control) information, and the like.

As described above, NR has introduced the concept of CORESET in order to secure the flexibility of a system. The CORESET (control resource set) refers to a time-frequency resource for a downlink control signal. The UE may decode a control channel candidate using one or more search spaces in the CORESET time-frequency resource. CORESET-specific QCL (quasi-colocation) assumption is configured and is used for the purpose of providing information on the characteristics of analogue beam directions, as well as delay spread, Doppler spread, Doppler shift, and an average delay, which are the characteristics assumed by existing QCL.

Figure 7:
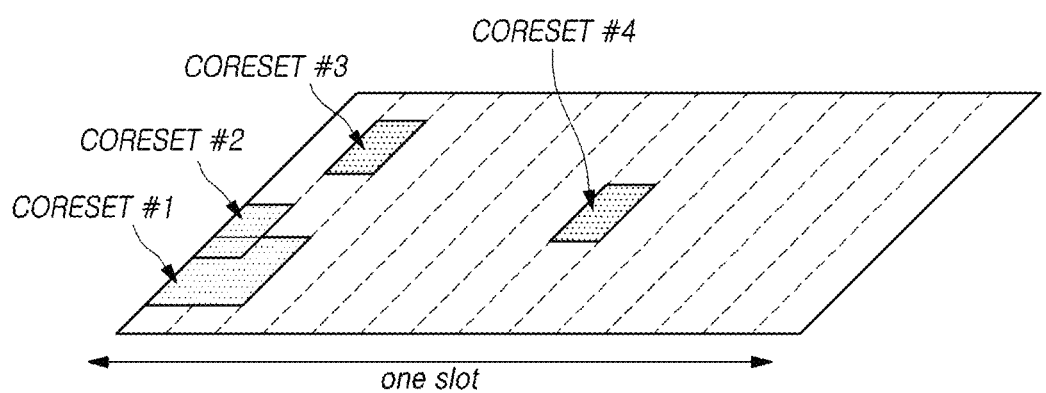
FIG. 7 is a view for explaining CORESET.

FIG. 7 is a view for explaining CORESETs.

Referring to FIG. 7, CORESETs may exist in various forms within a carrier bandwidth in a single slot, and the CORESET may include a maximum of 3 OFDM symbols in the time domain. In addition, the CORESET is defined as a multiple of six resource blocks up to the carrier bandwidth in the frequency domain.

A first CORESET, as a portion of the initial bandwidth part, is designated (e.g., instructed, assigned) through an MIB in order to receive additional configuration information and system information from a network. After establishing a connection with the base station, the UE may receive and configure one or more pieces of CORESET information through RRC signaling.

In this specification, a frequency, a frame, a subframe, a resource, a resource block, a region, a band, a subband, a control channel, a data channel, a synchronization signal, various reference signals, various signals, or various messages in relation to NR (New Radio) may be interpreted as meanings used at present or in the past or as various meanings to be used in the future.

5G NR (New Radio)

3GPP supports a multiple-subcarrier-based frame structure in connection with the frame structure of NR. In this regard, the basic subcarrier spacing (SCS) is 15 kHz, and a total of 5 types of SCSs obtained by multiplying 15 kHz by $2^\mu$ are supported. The SCS values according to the μ values are shown in Table 1 above.

Figure 8:
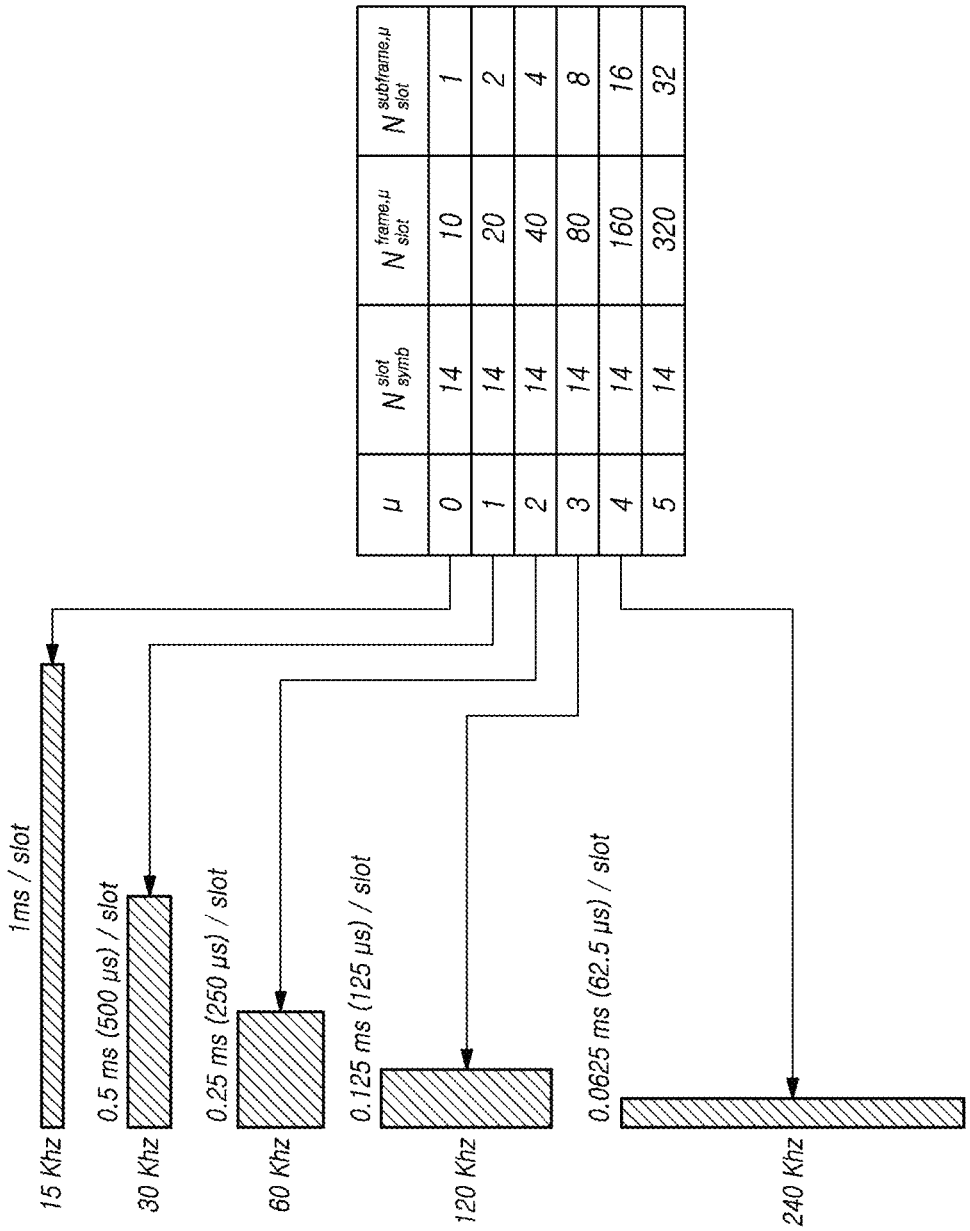
FIG. 8 is a view illustrating an example of symbol-level alignment in different SCSs to which an embodiment is applicable.

Referring to FIG. 8, the length of a slot is varied depending on the numerology. That is, the shorter the length of a slot, the larger the SCS. In addition, a slot is defined based on 14 OFDM symbols in NR.

Figure 9:
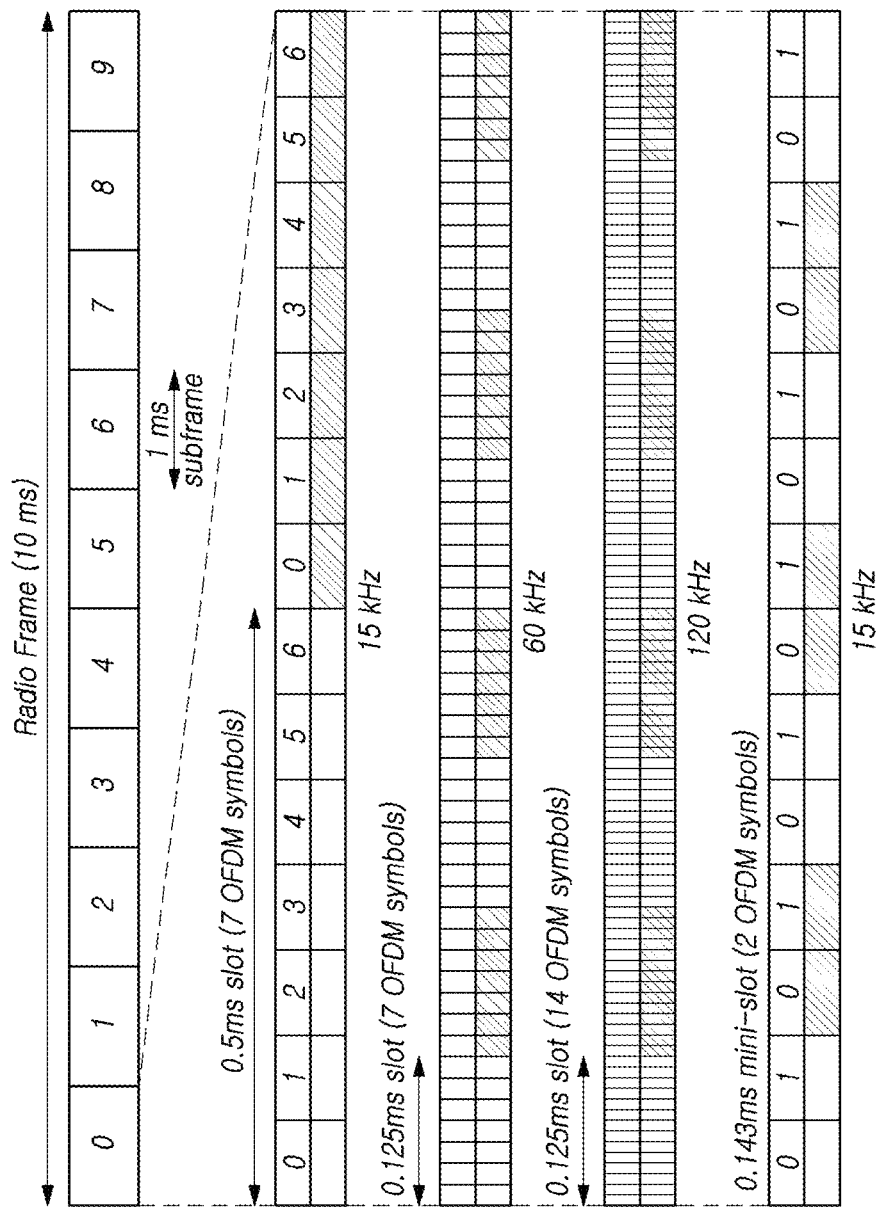
FIG. 9 is a view for explaining an NR time domain structure according to subcarrier spacing to which an embodiment is applicable.

NR supports a time domain structure on the time axis as follows. Unlike typical LTE, a basic scheduling unit is changed to a slot in NR In addition, referring to FIG. 9, the slot includes 14 OFDM symbols, regardless of subcarrier spacing, in NR. NR also supports a non-slot structure including 2, 4, and 7 OFDM symbols, which is a smaller scheduling unit. The non-slot structure may be utilized as a scheduling unit for URLLC services.

A radio frame is set to 10 ms irrespective of the numerology. A subframe is set to 1 ms as a reference to time duration. In NR, the subframe is not used as a data/control scheduling unit. The slot is primarily used in an eMBB and includes 14 OFDM symbols. A non-slot, such as a mini-slot, is used primarily in URLLC, but is not limited to URLLC and includes 2, 4 or 7 OFDM symbols. TTI duration is time duration for the data/control channel transmission and is configured as the number of OFDM symbols per slot/non-slot.

Wider Bandwidth Operations

The typical LTE system supports scalable bandwidth operations for any LTC CC (component carrier). That is, according to a frequency deployment scenario, an LTE provider may configure a bandwidth of a minimum of 1.4 MHz to a maximum of 20 MHz in configuring a single LTE CC, and a normal LTE UE supports a transmission/reception capability of a bandwidth of 20 MHz for a single LTE CC.

However, NR is designed to be able to support the UE of NR having different transmission/reception bandwidth capabilities through a single wideband NR CC. Accordingly, it is required to configure one or more bandwidth parts (BWPs) including subdivided bandwidths for an arbitrary NR CC, thereby supporting a flexible and wider bandwidth operation through configuration and activation of different bandwidth parts for respective UEs.

Specifically, one or more bandwidth parts may be configured through a single serving cell configured in terms of a UE in NR, and the UE is defined to activate one downlink (DL) bandwidth part and one uplink (UL) bandwidth part to use the same for uplink/downlink data transmission/reception in the corresponding serving cell. In addition, in the case where a plurality of serving cells is configured in the UE (i.e., the UE to which CA is applied), the UE is also defined to activate one downlink bandwidth part and/or one uplink bandwidth part in each serving cell to use the same for uplink/downlink data transmission/reception by utilizing radio resources of the corresponding serving cell.

Specifically, an initial bandwidth part for an initial access procedure of a UE may be defined in an arbitrary serving cell; one or more UE-specific bandwidth parts may be configured for each UE through dedicated RRC signalling; and a default bandwidth part for a fallback operation may be defined for each UE.

It is possible to make a definition such that a plurality of downlink and/or uplink bandwidth parts are simultaneously activated and used according to the capability of the UE and the configuration of the bandwidth parts in an arbitrary serving cell. However, definition was made in NR rel-15 such that only one downlink (DL) bandwidth part and one uplink (UL) bandwidth part are activated and used in an arbitrary UE at an arbitrary time.

NR-U

Unlike licensed bands, unlicensed bands are wireless channels that are allowed to be used by any provider or person in order to provide wireless communication services within the regulations of respective countries, instead of being exclusively used by a specific provider. Accordingly, it is required to solve i) a problem caused by co-existence with various short-range wireless communication protocols, such as Wi-Fi, Bluetooth, NFC, or the like, which is provided through unlicensed bands and ii) a problem caused by co-existence of NR providers and LTE providers when providing NR services through the corresponding unlicensed bands.

Therefore, in order to avoid interference or collision between the respective wireless communication services when providing NR services through the unlicensed band, it is necessary to support an LBT (listen before talk)-based wireless channel access scheme. In the LBT based wireless channel access scheme, a power level of a wireless channel or a carrier is sensed before transmitting a radio signal in order to determine whether or not the wireless channel or the carrier is available. In this case, if a specific wireless channel or carrier of the unlicensed band is in use by another wireless communication protocol or another provider, the NR services through the corresponding band will be limited, so that the QoS requested by the user may not be guaranteed in the wireless communication services through the unlicensed band, compared to the wireless communication services through the licensed band.

In particular, unlike typical LTE that supports an unlicensed spectrum only through carrier aggregation (CA) with a licensed spectrum, NR-U is based on deployment scenarios in the unlicensed band NR, such as a stand-alone NR-U cell or a dual-connectivity-based NR-U cell with an NR cell or an LTE cell in the licensed band. Thus, it is necessary to design a data transmission/reception method in order to satisfy a minimum QoS in the unlicensed band.

NR SSB

Figure 10:
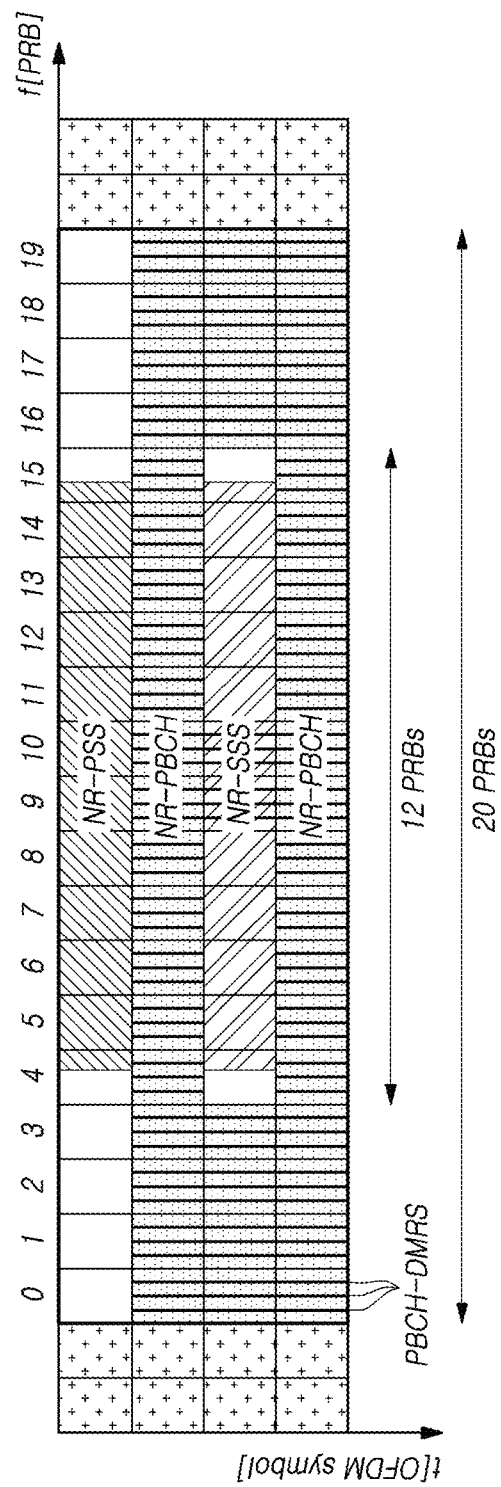
FIG. 10 is a diagram for explaining an NR PSS/SS/PBCH block to which an embodiment is applicable.

Referring to FIG. 10, unlike LTE, an NR SSB (synchronization signal block) may be transmitted in a variety of subcarrier spacings. The NR SSB is always transmitted along with a PBCH. In addition, the minimum required transmission bandwidth is defined for each subcarrier spacing as follows.

In a frequency band of less than 6 GHz, it is defined as 15 kHz of SCS and 5 MHz, excluding some specific bands such as bands n41, n77, and n78 having 30 kHz of SCS and 10 MHz. In a frequency band of 6 GHz and more, it is defined as 120 kHz of SCS and 10 MHz.

In addition, supported subcarrier spacing is different depending on the frequency band. In a frequency band of less than 1 GHz, SCSs of 15 kHz, 30 kHz, and 60 kHz are supported. In a frequency band of 1 GHz to 6 GHz, SCSs of 15 kHz, 30 kHz, and 60 kHz are supported. In a frequency band of 24 GHz to 52.6 GHz, SCSs of 60 kHz and 120 kHz are supported. In addition, 240 kHz of SCS is not applied to data.

Figure 11:
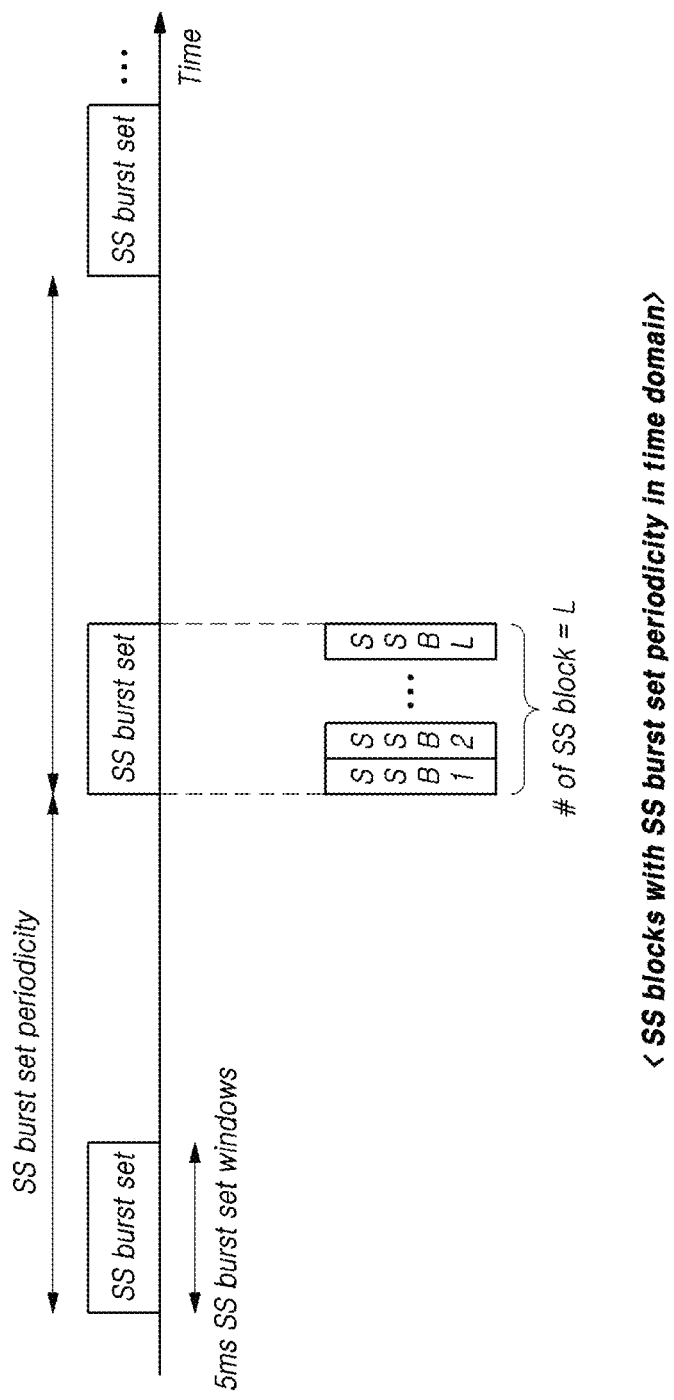
FIG. 11 is a diagram for explaining SSB burst periodicity to which an embodiment is applicable.

Referring to FIG. 11, SSBs are transmitted in the form of an SSB burst set, instead of being transmitted as a single SSB. Primarily, the SSB burst set has 5 ms irrespective of the numerology, and the maximum number L of SSB blocks that may be transmitted in a set is as follows.

L is set to 4 in the frequency range of up to 3 GHz. L is set to 8 in the frequency range of 3 GHz to 6 GHz. L is set to 64 in the frequency range of 6 GHz to 52.6 GHz.

In addition, the periodicity in which the defined SSB burst set is transmitted is further configured using an RRC, and indication information thereof is transmitted to the UE. A UE performing initial access obtains synchronization on the assumption that a default periodicity is 20 ms, and updates system information. Thereafter, the periodicity value of the SSB burst is finally updated by the base station.

In NR-U, a stand-alone design for the unlicensed band is taken into account. In addition, multiple bandwidth parts (BWPs) or subband scheduling is considered in order to increase the probability of LBT success. Accordingly, it may be necessary to design an interlacing pattern applicable to the transmission of an uplink channel.

Hereinafter, a method for transmitting an uplink channel to which interlacing is applied in an unlicensed band will be described in detail with reference to the related drawings.

Figure 12:
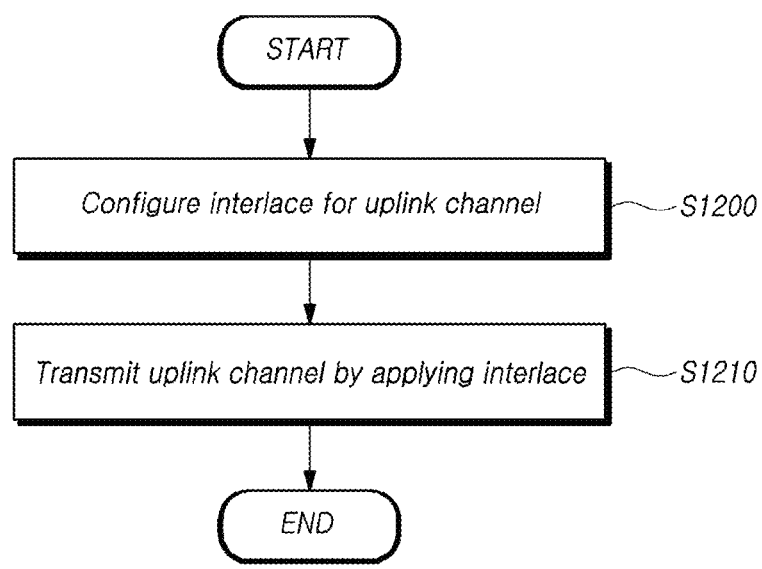
FIG. 12 is a flowchart illustrating a procedure of a User Equipment (UE) for transmitting an uplink channel in an unlicensed band according to an embodiment.

FIG. 12 is a flowchart illustrating a procedure of a UE for transmitting an uplink channel in an unlicensed band according to an embodiment.

Referring to FIG. 12, the UE may configure interlaces for an uplink channel on the basis of interlacing information determined according to subcarrier spacing (SCS) of an unlicensed band (S1200).

The UE may configure interlaces for an uplink channel in order to transmit the uplink channel in the unlicensed band. Interlacing spacing in units of PRBs may be configured in the interlaces, and respective interlaces may be repeatedly configured according to the interlacing spacing.

The interlacing information on an interlacing pattern may be determined to be different according to the subcarrier spacing of the unlicensed band. In this case, an interlacing pattern for each subband may be configured in resource allocation for each subband constituting the bandwidth. Hereinafter, a description will be made on the basis of the subbands, but the present disclosure is not limited thereto. The following description may be applied to the multiple BWPs in substantially the same manner. In addition, although a description will be made of the uplink, it may be applied to the downlink in substantially the same manner.

The subbands used for the transmission of an uplink channel may be configured to have different bandwidths from each other, and interlacing may be applied differently to the respective subbands. In this case, values for the sizes of the subbands may be taken into consideration when configuring the interlacing pattern. When defining an interlacing pattern for each subband, the size of a subband or the number of PRBs of the subband may be used.

If the subband size is fixed, the interlacing unit may be configured to be different according to the subcarrier spacing of the subband. For example, it is assumed that the bandwidth of the subband is 20 MHz. In the case where the SCSs of the subband are 15 kHz, 30 kHz, and 60 kHz, respectively, the numbers of PRBs of the subband according to the respective SCSs are 100, 50, and 25, respectively.

In this case, since the numbers of PRBs defined for the SCS are different between the SCSs, the interlacing spacing and the interlacing unit included in the interlacing information may be configured according thereto. For example, if the SCS is 15 kHz, the interlacing unit may include 10 interlaces with a spacing of 10 PRBs. If the SCS is 30 kHz, the interlacing unit may include 5 interlaces with a spacing of 10 PRBs. That is, the interlacing information may be configured to be variable depending on the SCS of the subband.

For example, the interlacing information may be directly transmitted through DCI signaling. For example, if the UE detects a corresponding PDCCH, the interlacing field, which is a DCI field included in the corresponding grant, may indicate the interlacing unit such as subband #0: 0, subband #1: 1, and the like. That is, it is assumed that the interlacing field value "0" indicates a spacing of 10 RBs and the interlacing field value "1" indicates a spacing of 5 RBs. In this case, the interlacing unit may be configured as 10 PRBs for subband #0, and the interlacing unit may be configured as 5 PRBs for subband #1.

As another example, the interlacing information may be directly transmitted through RRC signalling. An interlacing pattern value for multiple subbands may be indicated through single RRC signaling, and the specific method thereof may be substantially the same as the method using the DCI described above.

As another example, the interlacing information may be determined as a value, which is dependent on the size of the subband or BWP. In this case, unlike the case of using the above-described DCI or RRC signaling, there is no need to perform signaling separately in order to provide the UE with indication of the interlacing unit. That is, the interlacing unit may be determined in a predefined manner through a value defined at the time of dividing the subband.

In this case, the interlacing unit may be determined to be a predefined size according to the size of the initially divided subband. If the size of the bandwidth for each subband is determined when setting the initial subband, the interlacing spacing satisfying the corresponding range is determined according thereto, and basic interlacing units may also be determined according to the interlacing spacing. For example, if the bandwidth of the subband is determined to be 20 MHz, the interlacing spacing is determined to be 10 PRBs. In this case, since respective interlacing units are determined with a spacing of 10 PRBs for a total of 100 PRBs, the number of interlacing units may be determined to be 10.

As another example, the interlacing unit may be determined according to the size of a resource allocation field in the DCI. In this case, the size of a resource allocation field may be used for performing interlacing. For example, if the number of bits for resource allocation is limited to "N_RA", the interlacing pattern may be determined according thereto. For example, it is assumed that bitmap-based resource allocation is applied in the case where N_RA is 10 bits and the SCS is 15 kHz. In the case of a subband with a bandwidth of 20 MHz, the interlacing spacing becomes 10 PRBs, and the number of interlacing units in which resource allocation is actually performed is 10. Therefore, the resource allocation may be performed with an N_RA of 10 bits. Alternatively, if the interlacing spacing is 5 PRBs, the number of interlacing units is 20, so that N_RA requires 20 bits. Therefore, since N_RA exceeds the predetermined resource allocation field of 10 bits, interlacing with a spacing of 5 PRBs cannot be applied to the corresponding subband.

If the bandwidth is 10 MHz, a total of 50 PRBs may be divided to have a spacing of 5 units. Therefore, ten interlacing units may be generated, and resource allocation may be performed with an N_RA of 10 bits.

The UE may perform interlacing for the uplink channel on the basis of the interlacing information.

Referring again to FIG. 12, the UE may transmit an uplink channel by applying the interlace (S1210).

According to the embodiment, it is possible to provide a method and apparatus for transmitting an uplink channel on the basis of interlacing information determined according to subcarrier spacing in an unlicensed band.

Figure 13:
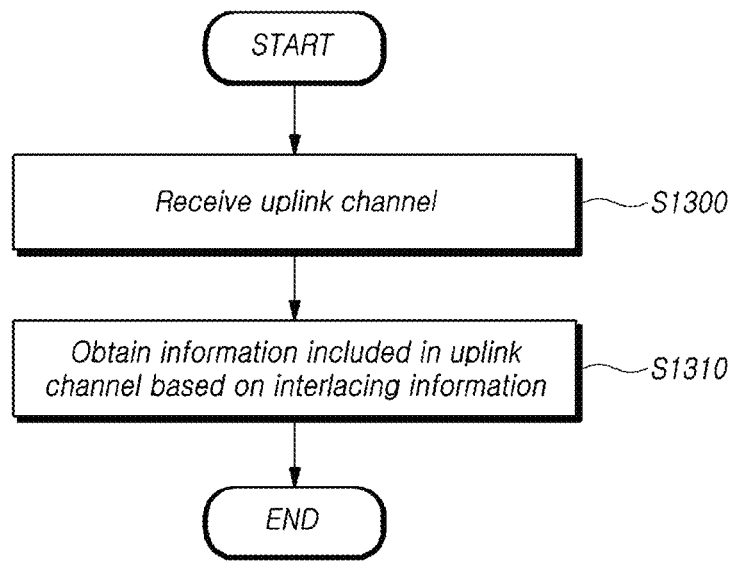
FIG. 13 is a flowchart illustrating a procedure of a base station for receiving an uplink channel in an unlicensed band according to an embodiment.

FIG. 13 is a flowchart illustrating a procedure of a base station for receiving an uplink channel in an unlicensed band according to an embodiment.

Referring to FIG. 13, the base station may receive an uplink channel to which the interlace was applied in an unlicensed band (S1300).

Referring back to FIG. 13, the base station may acquire information included in the uplink channel on the basis of the interlace information about the interlace (S1310).

For example, the base station may receive an uplink channel to which the interlace configured in the UE was applied. Interlacing spacing in units of PRBs may be configured in the interlaces, and respective interlaces may be repeatedly configured according to the interlacing spacing.

For example, the interlacing information on an interlacing pattern may be determined to be different according to the subcarrier spacing of the unlicensed band. In this case, an interlacing pattern for each subband may be configured in resource allocation for each subband constituting the bandwidth.

For example, the subbands used for transmission of an uplink channel may be configured to have different bandwidths from each other, and interlacing may be applied differently to the respective subbands. In this case, values for the sizes of the subbands may be taken into consideration when configuring the interlacing pattern. When defining an interlacing pattern for each subband, the size of a subband or the number of PRBs of the subband may be used.

If the subband size is fixed, the interlacing unit may be configured to be different according to the subcarrier spacing of the subband. For example, it is assumed that the bandwidth of the subband is 20 MHz. In the case where the SCSs of the subband are 15 kHz, 30 kHz, and 60 kHz, respectively, the numbers of PRBs of the subband according to respective SCSs are 100, 50, and 25, respectively.

In this case, since the numbers of PRBs defined for the SCS are different between the SCSs, the interlacing spacing and the interlacing unit included in the interlacing information may be configured according thereto. For example, if the SCS is 15 kHz, the interlacing unit may include 10 interlaces with a spacing of 10 PRBs. If the SCS is 30 kHz, the interlacing unit may include 5 interlaces with a spacing of 10 PRBs. That is, the interlacing information may be configured to be variable depending on the SCS of the subband.

For example, the base station may perform direct signalling of the interlacing information through a DCI. For example, if a UE detects a corresponding PDCCH, the interlacing field, which is a DCI field included in the corresponding grant, may indicate the interlacing unit such as subband #0: 0, subband #1: 1, and the like. That is, it is assumed that the interlacing field value "0" indicates a spacing of 10 RBs and the interlacing field value "1" indicates a spacing of 5 RBs. In this case, the interlacing unit may be configured as 10 PRBs for subband #0, and the interlacing unit may be configured as 5 PRBs for subband #1.

As another example, the base station may perform direct signaling of the interlacing information through RRC signaling. An interlacing pattern value for multiple subbands may be indicated through single RRC signaling, and the specific method thereof may be substantially the same as the method using the DCI described above.

As another example, the interlacing information may be determined as a value, which is dependent on the size of the subband or BWP. In this case, unlike the case of using the above-described DCI or RRC signaling, the base station does not need to perform signaling separately in order to provide the UE with indication of the interlacing unit. That is, the interlacing unit may be determined in a predefined manner through a value defined at the time of dividing the subband.

In this case, the interlacing unit may be determined to be a predefined size according to the size of the initially divided subband. If the size of the bandwidth for each subband is determined when setting the initial subband, the interlacing spacing satisfying the corresponding range is determined according thereto, and basic interlacing units may also be determined according to the interlacing spacing. For example, if the bandwidth of the subband is determined to be 20 MHz, the interlacing spacing is determined to be 10 PRBs. In this case, since respective interlacing units are determined with a spacing of 10 PRBs for a total of 100 PRBs, the number of interlacing units may be determined to be 10.

As another example, the interlacing unit may be determined according to the size of a resource allocation field in the DCI. In this case, the size of a resource allocation field may be used for performing interlacing. For example, if the number of bits for resource allocation is limited to "N_RA", the interlacing pattern may be determined according thereto. For example, it is assumed that bitmap-based resource allocation is applied in the case where N_RA is 10 bits and the SCS is 15 kHz. In the case of a subband with a bandwidth of 20 MHz, the interlacing spacing becomes 10 PRBs, and the number of interlacing units in which resource allocation is actually performed is 10. Therefore, the resource allocation may be performed with an N_RA of 10 bits. Alternatively, if the interlacing spacing is 5 PRBs, the number of interlacing units is 20, so that N_RA requires 20 bits. Therefore, since N_RA exceeds the predetermined resource allocation field of 10 bits, interlacing with a spacing of 5 PRBs cannot be applied to the corresponding subband.

If the bandwidth is 10 MHz, a total of 50 PRBs may be divided to have a spacing of 5 units. Therefore, ten interlacing units may be generated, and resource allocation may be performed with an N_RA of 10 bits.

The base station may obtain information from the uplink channel to which interlacing was applied on the basis of the interlacing information.

According to the embodiment, it is possible to provide a method and apparatus capable of receiving an uplink channel on the basis of interlacing information determined according to subcarrier spacing in the unlicensed band.

Hereinafter, respective embodiments for transmitting the uplink channel with interlacing applied in an unlicensed band of NR will be described in detail with reference to the related drawings.

In NR, a channel access procedure for access to an unlicensed band may be configured as follows. An LTE-LAA (license assisted access) channel access mechanism may be employed as a reference for 5 GHz. The LTE-LAA channel access mechanism may be employed as a start point of design for 6 GHz. In the case of a band of 5 GHz, a no-LBT option is useful for NR-U along with support for high-speed A/N feedback, and may be allowed according to regulations. The limitations or conditions for allowing the no-LBT option to be used may be further confirmed in consideration of fair co-existence.

The no-LBT option may be applied to a band of 6 GHz if it is allowed by regulations. The limitations or conditions for allowing the no-LBT option to be used may be confirmed in the case where a criterion for fair co-existence is defined for the band of 6 GHz. In this case, since the channel access mechanism must follow regulations, it may need to be adjusted to conform to a specific frequency range.

An initial active DL/UL BWP may be about 20 MHz in a band of 5 GHz. A final value may be quantized to the number of PRBs. If channelization in a band of 6 GHz is performed in a similar manner as that in the band of 5 GHz, the initial active DL/UL BWP may be about 20 MHz in the band of 6 GHz.

The present disclosure proposes a resource allocation method for supporting the multiple LBT structure of NR described above. In NR-U, LBT (listen before talk) is performed in order to provide co-existence with Wi-Fi devices, and a corresponding channel is used only when it is empty. In addition, the LBT may be performed by dividing the entire bandwidth, which may be allocated to a wide band, into a plurality of BWPs or subbands.

Accordingly, the present disclosure proposes a resource allocation method that involves the success or failure of the LBT and an interlacing method specialized for a corresponding subband and BWP in a subband-based resource allocation.

Hereinafter, a description will be made on the basis of NR-U for the unlicensed band, but the disclosure is not limited thereto. The following description may be applied to NR and LTE in substantially the same manner as long as it substantially conforms to the concept of the disclosure. In addition, the following description based on a subband may be applied to the BWP in substantially the same manner even if the subband is replaced by the BWP as long as it substantially conforms to the concept of the disclosure.

Embodiment 1. Interlacing Units for Respective Subbands May be Configured to be Different from Each Other Hereinafter, an interlacing method for each subband or BWP in resource allocation for each subband or BWP will be described. That is, a method of configuring an interlacing pattern for a plurality of subbands or BWPs will be described. Although a description of the embodiment will be made on the basis of subbands below, the embodiment is not limited thereto, and the embodiment may be applied to BWPs in substantially the same manner. In addition, a description of the embodiment will be made on the basis of an uplink, but the embodiment may be applied to a downlink in substantially the same manner.

Hereinafter, it is assumed that interlacing may be applied differently to the respective subbands. It is also assumed that the subbands or BWPs may be defined to have different bandwidths. In this case, values for the size of the subband or the size of the BWP may be considered in order to define the interlacing pattern as follows.

According to an example, when defining an interlacing pattern for each subband, the size of a subband or the number of PRBs of a subband may be used. For example, the size of a subband or the number of PRBs of a subband for defining an interlacing pattern for each subband may be configured as shown in Table 2. According to an example, the SCS of the subband is assumed to be 15 kHz.

TABLE 2

| Subband size (MHz) | Interlacing spacing | No. of interlacing units |
|---|---|---|
| 20 MHz (100PRBs) | 20 PRBs, 10 PRBs | 5 units, 10 units |
| 15 MHz (75PRBs) | 15 PRBs, 5 PRBs | 5 units, 15 units |
| 10 MHz (50PRBs) | 10 PRBs, 5 PRBs | 5 units, 10 units |
| 5 MHz (25PRBs) | 5 PRBs | 5 units |
| ... | ... | ... |

Figure 14:
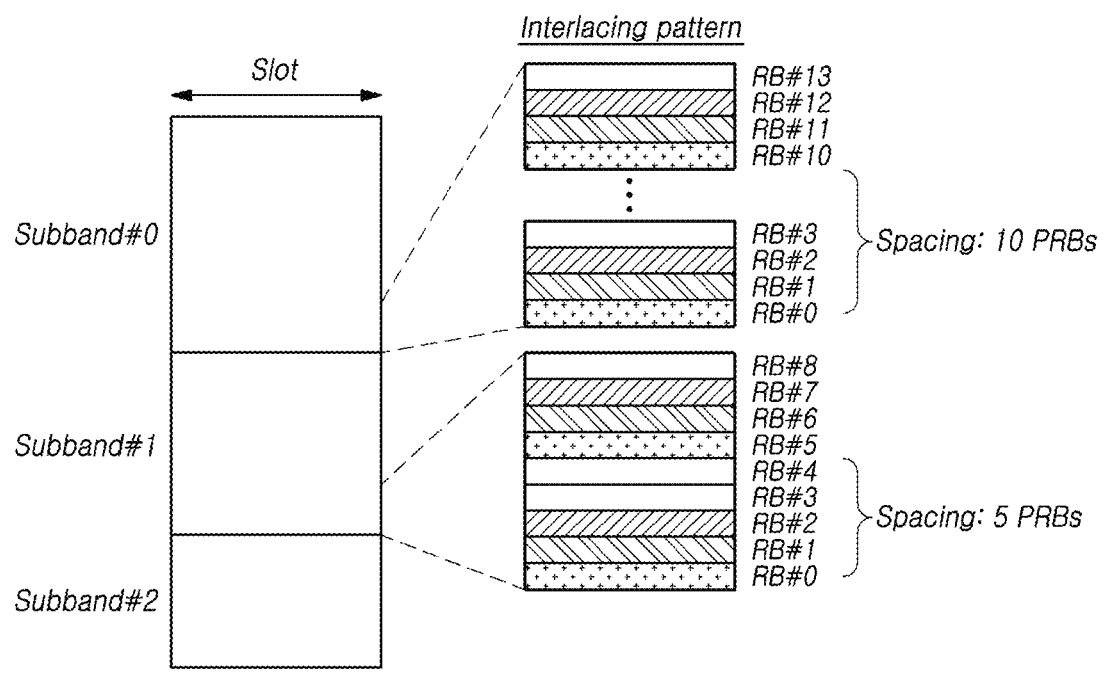
FIG. 14 is a view illustrating that different interlacing patterns are applied to respective subbands to which an embodiment is applicable.

Referring to Table 2, different interlacing patterns may be applied to the respective subbands depending on the size of a subband. For example, as shown in FIG. 14, the interlacing spacing may be differently configured as 10 PRBs and 5 PRBs in subband #0 and subband #1, respectively.

As another example, the size of a BWP may be used for defining the interlacing pattern for each subband. In the case of a UE supporting multiple BWP operations, different interlacing patterns may be configured in respective BWPs. As shown in FIG. 14 illustrating that the interlacing spacing is configured differently between the subbands, the interlacing spacing may also be configured differently between the BWPs.

In this regard, an embodiment for determining an interlacing pattern for each subband will be described below.

For example, the interlacing pattern and unit may be directly transmitted through DCI signaling. That is, the interlacing pattern for each subband may be directly indicated in the DCI. This means that the interlacing spacing to be applied to each subband may be indicated in the existing DCI. According to this, the interlacing pattern and unit may be changed most flexibly for each subband.

For example, if the UE detects a corresponding PDCCH, the interlacing field, which is a DCI field included in the corresponding grant, may indicate the interlacing unit such as subband #0: 0, subband #1: 1, and the like. That is, it is assumed that the interlacing field value "0" indicates a spacing of 10 RBs and the interlacing field value "1" indicates a spacing of 5 RBs. In this case, the interlacing unit may be configured as 10 PRBs for subband #0, and the interlacing unit may be configured as 5 PRBs for subband #1.

As another example, the interlacing unit may be directly transmitted through RRC signaling. That is, the interlacing pattern for each subband may be indicated through RRC signaling. An interlacing pattern value for multiple subbands may be indicated through single RRC signaling, and the specific method thereof may be substantially the same as the method using the DCI described above. However, in the case of the BWP, the interlacing pattern value to be applied to each BWP is applied to the UE through the RRC signaling.

As another example, the interlacing unit may be determined as a value, which is dependent on the size of the subband or BWP. In this case, unlike the case of using the DCI or RRC signaling described above, there is no need to perform signaling separately in order to provide the UE with indication of the interlacing unit. That is, the interlacing unit may be determined in a predefined manner through a value defined at the time of dividing the subband.

In this case, the interlacing unit may be determined to be a predefined size according to the size of the initially divided subband or BWP, as shown in Table 3. If the size of the bandwidth for each subband is determined when setting the initial subband, the interlacing spacing satisfying the corresponding range is determined according thereto, and basic interlacing units may also be determined according to the interlacing spacing. For example, if the bandwidth of the subband is determined to be 20 MHz, the interlacing spacing is determined to be 10 PRBs. In this case, since respective interlacing units are determined with a spacing of 10 PRBs for a total of 100 PRBs, the number of interlacing units may be determined to be 10.

TABLE 3

| Subband or BWP bandwidth (MHz) | Interlacing spacing | No. of interlacing units |
| --- | --- | --- |
| 20 MHz (100PRBs) | 10 PRBs | 10 units |
| 15 MHz (75PRBs) | 5 PRBs | 15 units |
| 10 MHz (50PRBs) | 5 PRBs | 10 units |
| 5 MHz (25PRBs) | X | X |
| ... | ... | ... |

As another example, the interlacing unit may be determined according to the size of a resource allocation field in the DCI. In this case, the size of a resource allocation field may be used for performing interlacing. In addition, resource allocation methods may be considered. Specifically, the resource allocation methods may include a method of allocating a single subband using a single DCI and a method of allocating multiple subbands using multiple DCIs. In the latter, the interlacing pattern may be repeatedly applied to the respective subbands.

Specifically, in interlacing-based subband resource allocation, the number of interlaces of consecutive indexes and the starting index may be indicated through UL resource allocation type 2. Alternatively, a bitmap may be used for interlacing-based subband resource allocation. Alternatively, a predefined resource allocation pattern may be used for interlacing-based subband resource allocation.

In this case, if the number of bits for resource allocation is limited to "N_RA", the interlacing pattern may be determined according thereto. For example, it is assumed that bitmap-based resource allocation is applied in the case where N_RA is 10 bits and the SCS is 15 kHz. In the case of a subband with a bandwidth of 20 MHz, the interlacing spacing becomes 10 PRBs, and the number of interlacing units in which resource allocation is actually performed is 10. Therefore, the resource allocation may be performed with an N_RA of 10 bits. Alternatively, if the interlacing spacing is 5 PRBs, the number of interlacing units is 20, so that N_RA requires 20 bits. Therefore, since N_RA exceeds the predetermined resource allocation field of 10 bits, interlacing with a spacing of 5 PRBs cannot be applied to the corresponding subband.

If the bandwidth is 10 MHz, a total of 50 PRBs may be divided to have a spacing of 5 units. Therefore, 10 interlacing units may be generated, and resource allocation may be performed with an N_RA of 10 bits.

Figure 15:
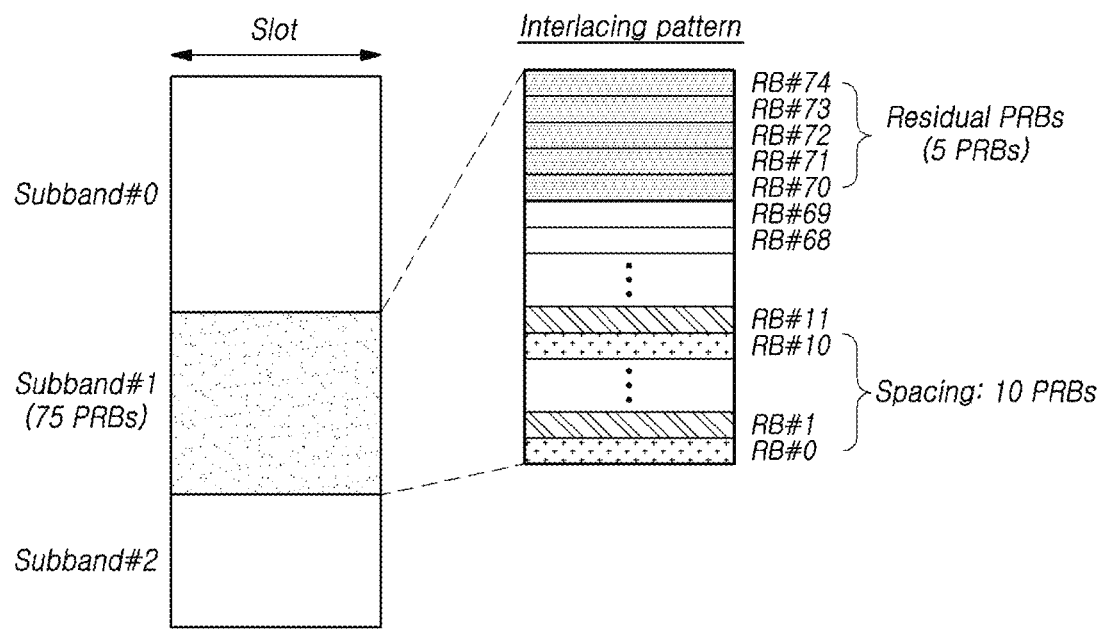
FIGS. 15 and 16 are views for explaining residual PRBs and interlacing patterns having a predetermined spacing to which an embodiment is applicable.

As another example, it is possible to make a configuration to or not to use the residual PRBs that are not evenly distributed to the interlacing units through the entire bandwidth. When dividing PRBs for interlacing, residual PRBs may occur, which do not belong to the interlacing units. In the case where the interlacing spacing is determined to be a specific unit, the total PRBs of the bandwidth may be indivisible by the subbands or BWPs. For example, referring to FIG. 15, in the case of subband #1 with a bandwidth of 75 PRBs, if the interlacing spacing is defined as 10 PRBs, the remainder is 5 PRBs. The UE may receive indication on whether or not to use the residual PRBs. For example, indication on whether or not to use the residual PRBs may be received through DCI or RRC signaling. If a field for indication is added to the DCI, signaling of an ON/OFF state may be performed using 1 bit. Similarly, the indication may be performed through RRC signaling.

For example, if indication not to use the residual PRBs are received, resources may not be allocated to the residual PRBs resulting from the division of the total PRBs by the interlacing spacing value. Alternatively, if indication to use the residual PRBs are received, resources may also be allocated to the residual PRBs resulting from the division of the total PRBs by the interlacing spacing value. To this end, the indication on whether or not to use the residual PRBs may be transmitted through DCI or RRC signaling.

Figure 16:
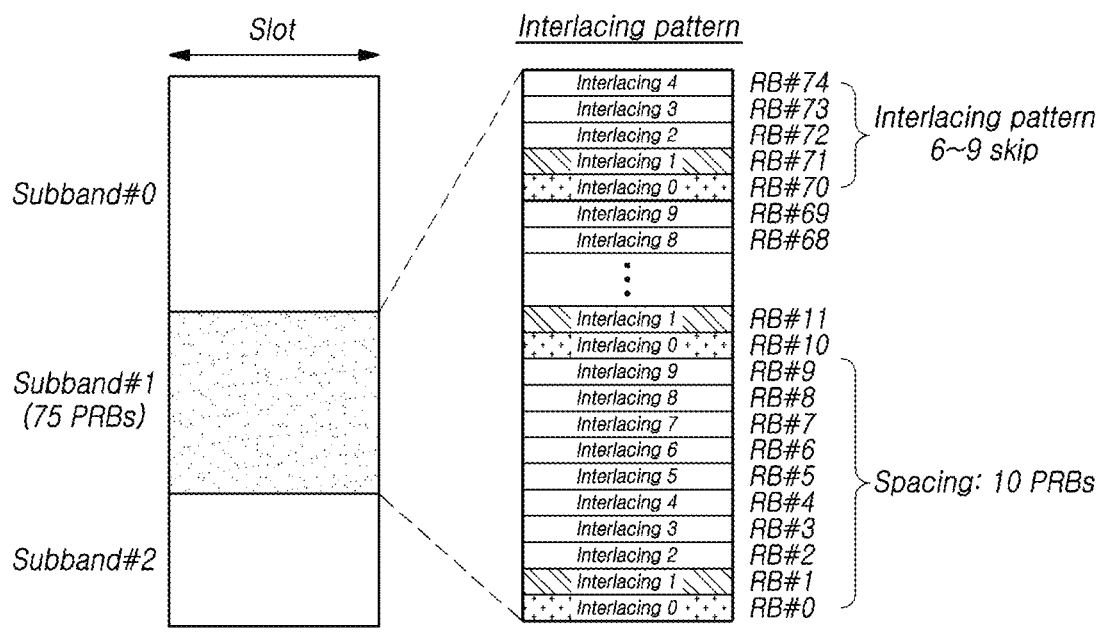

If the residual PRBs are used, an existing interlacing pattern may be applied to the same in the same manner. In this case, the latter portion of the interlacing pattern is omitted. For example, as shown in FIG. 16, only five of the ten interlacing patterns are defined with respect to the residual PRBs (RB #70 to RB #74), and the remaining patterns are omitted. This method of defining the interlacing pattern may be applied to the configuration of BWPs in substantially the same manner.

As another example, if the size of a subband is fixed, the interlacing unit may be configured differently depending on subcarrier spacing. In this case, the indication through DCI or RRC signaling or the example in which the interlacing unit is determined according to a predefined configuration, as described above, may be applied in substantially the same manner. Therefore, hereinafter, a method of considering the number of PRBs depending on the SCS in the case where the bandwidth of a subband is fixed to a specific value will be described in detail. For example, if the bandwidth of a subband is assumed to be 20 MHz, and if the SCSs are 15 kHz, 30 kHz, and 60 kHz, respectively, the number of PRBs according to the SCS is shown in Table 4.

TABLE 4

| SCS (No. of PRBs) | Interlacing spacing | No. of interlacing units |
| --- | --- | --- |
| 15 kHz (100PRBs) | 10 PRBs | 10 units |
| 30 kHz (50PRBs) | 10 PRBs, 5 PRBs | 5 units, 10 units |
| 60 kHz (25PRBs) | 5 PRBs | 5 units |
| ... | ... | |

In this case, since the numbers of PRBs are different between the SCSs, the interlacing spacing and the interlacing unit may be applied corresponding thereto. For example, the SCS of 15 kHz supports the interlacing spacing of 10 PRBs, and thus 10 interlacing units may be determined. Alternatively, the SCS of 30 kHz supports the interlacing spacing of 10 or 5 PRBs, and the SCS of 60 kHz supports the interlacing spacing of 5 PRBs. Accordingly, the interlacing pattern may be configured to be variable depending on the SCS of the subband or BWP.

According to the embodiment, it is possible to provide a method and apparatus for transmitting an uplink channel in an unlicensed band on the basis of the interlacing information determined according to the subcarrier spacing.

Embodiment 2. A Resource Allocation Method Capable of Indicating Resources on a Subband Basis May be Applied In NR-U, a stand-alone design for the unlicensed band is taken into consideration. In addition, multiple BWPs (bandwidth parts), subband scheduling, and the like are considered in order to increase the probability of LBT success. However, since resources are also transmitted after the LBT in scheduling for each subband or BWP, it may be required to provide the UE with information on whether or not the LBT is successful at the time of scheduling.

In the embodiment, it is assumed that one DCI is used in allocating resources based on multiple subbands. That is, if the UE detects the corresponding DCI, the mapped subband of a PDSCH in which transmission is actually performed after the LBT success may be indicated through a resource allocation field. That is, an existing resource allocation field may be replaced with the subband allocation field. In this case, a subband allocation method may be expressed in a bitmap format such as resource allocation type-0.

Specifically, if it is assumed that the resource allocation field in the DCI has N-bits, N_subband bits among the N-bits may be interpreted as bits for allocating the subband in which the PDSCH is actually transmitted after the LBT success. The remaining N-N_subband bits may be used to indicate a separate field for actual allocation of PRBs in the subband.

According to this, the UE may receive the PDSCH through resource allocation in normal type-0 without recognizing whether or not the LBT is provided for each subband. It is assumed that the following allocation of a PRB set in the subband may be applied to the all subbands in the same manner. However, if the resource allocation field is not limited, it is possible to allocate different PRB sets to respective subbands. This may be applied to the multiple BWPs in substantially the same manner.

For example, it may be assumed that all PRBs in the subband are used. That is, the UE may assume that data is allocated to all the PRBs in the allocated subbands.

As another example, it may be instructed to use some PRBs in the subband. For example, a PRB set to transmit data by the UE may be predefined in the subband. In this case, an actual PRB set may be allocated to the subband in a predefined form with respect to resource allocation in the UE. That is, the PRB set for performing the data transmission may be determined according to a predetermined pattern at the time of configuring the initial subband without any change.

Alternatively, as another example, a PRB set for transmitting data by the UE in the subband may be indicated through DCI or RRC signaling. In this case, the allocation position of the PRB set in the subband may be directly indicated through DCI or RRC signaling. For example, if 4 bits of N-N_subband are provided for additional bits, information on whether or not to transmit 4 PRB sets provided in the subband may be expressed as "on/off" using each bit.

Alternatively, as another example, the PRB set for the UE to transmit data in the subband may be determined using indirect information. In this case, the UE may recognize the position where the PDSCH is actually transmitted with respect to the PRB set allocation position in the subband by utilizing the information such as UE-ID, a DMRS antenna port, or the like.

According to the embodiment, it is possible to provide a method and apparatus for indicating resource allocation in units of subbands in an unlicensed band.

Hereinafter, structures of a UE and a base station for performing some or all of the embodiments described in connection with FIGS. 1 to 16 will be described with reference to the drawings.

Figure 17:
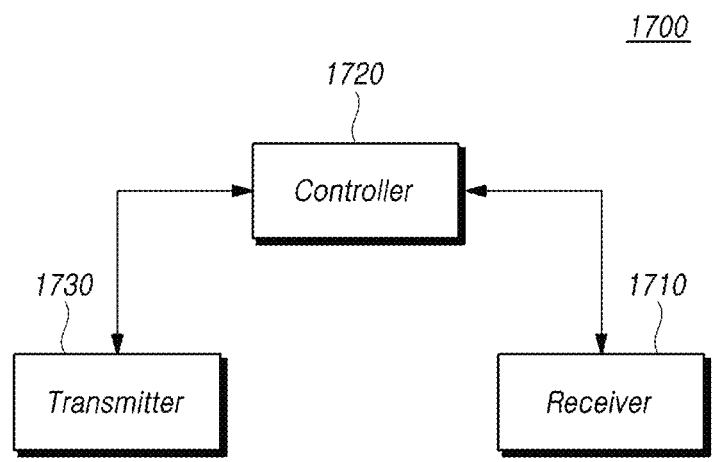
FIG. 17 is a block diagram illustrating a User Equipment (UE) according to another embodiment.

FIG. 17 is a block diagram illustrating a UE 1700 according to an embodiment. Referring to FIG. 17, a UE 1700 includes a receiver 1710, a controller 1720, and a transmitter 1730.

The receiver 1710 receives, from a base station, downlink control information, data, and messages through corresponding channels. In addition, the controller 1720 controls the overall operations of the UE 1700 for performing a method for transmitting an uplink channel in an unlicensed band. The transmitter 1730 transmits uplink control information, data, and messages to the base station through corresponding channels.

For example, the controller 1720 may configure interlaces for an uplink channel on the basis of interlacing information determined according to subcarrier spacing (SCS) of an unlicensed band (S1200).

For example, the controller 1720 may configure an interlace for an uplink channel in order to transmit the uplink channel in the unlicensed band. Interlacing spacing in units of PRBs may be configured in the interlaces, and respective interlaces may be repeatedly configured according to the interlacing spacing.

For example, the controller 1720 may determine interlacing information about interlacing patterns according to the subcarrier spacing of the unlicensed band. In this case, an interlacing pattern for each subband may be configured in resource allocation for each subband constituting the bandwidth.

For example, the subbands used for the transmission of an uplink channel may be configured to have different bandwidths from each other, and interlacing may be applied differently to the respective subband. In this case, values for the sizes of the subbands may be taken into consideration when configuring the interlacing pattern. When defining an interlacing pattern for each subband, the size of a subband or the number of PRBs of the subband may be used.

If the size of subband is fixed, the interlacing unit may be configured to be different according to the subcarrier spacing of the subband. For example, it is assumed that the bandwidth of the subband is 20 MHz. In the case where the SCSs of the subband are 15 kHz, 30 kHz, and 60 kHz, respectively, the numbers of PRBs of the subband according to respective SCSs are 100, 50, and 25, respectively.

In this case, since the numbers of PRBs defined for the SCS are different between the SCSs, the interlacing spacing and the interlacing unit included in the interlacing information may be configured according thereto. For example, if the SCS is 15 kHz, the interlacing unit may include 10 interlaces with spacing of 10 PRBs. If the SCS is 30 kHz, the interlacing unit may include 5 interlaces with spacing of 10 PRBs. That is, the interlacing information may be configured to be variable depending on the SCS of the subband.

For example, the receiver 1710 may receive interlacing information through a DCI. For example, if the UE detects a corresponding PDCCH, the interlacing field, which is a DCI field included in the corresponding grant, may indicate the interlacing unit such as subband #0: 0, subband #1: 1, and the like. That is, it is assumed that the interlacing field value "0" indicates a spacing of 10 RBs and the interlacing field value "1" indicates a spacing of 5 RBs. In this case, the interlacing unit may be configured as 10 PRBs for subband #0, and the interlacing unit may be configured as 5 PRBs for subband #1.

As another example, the receiver 1710 may receive interlacing information through RRC signaling. An interlacing pattern value for multiple subbands may be indicated through single RRC signaling, and the specific method thereof may be substantially the same as the method using the DCI described above.

As another example, the controller 1720 may determine the interlacing information as a value, which is dependent on the size of the subband or BWP. In this case, unlike using the above-described DCI or RRC signaling, there is no need to perform signaling separately in order to provide the UE with indication of the interlacing unit. That is, the interlacing unit may be determined in a predefined manner through a value defined at the time of dividing the subband.

In this case, the interlacing unit may be determined to be a predefined size according to the size of the initially divided subband. If the size of the bandwidth for each subband is determined when setting the initial subband, the interlacing spacing satisfying the corresponding range is determined according thereto, and basic interlacing units may also be determined according to the interlacing spacing. For example, if the bandwidth of the subband is determined to be 20 MHz, the interlacing spacing is determined to be 10 PRBs. In this case, since respective interlacing units are determined with a spacing of 10 PRBs for a total of 100 PRBs, the number of interlacing units may be determined to be 10.

As another example, the controller 1720 may determine the interlacing unit according to the size of a resource allocation field in the DCI. In this case, the size of a resource allocation field may be used for performing interlacing. For example, if the number of bits for resource allocation is limited to "N_RA", the interlacing pattern may be determined according thereto. For example, it is assumed that bitmap-based resource allocation is applied in the case where N_RA is 10 bits and the SCS is 15 kHz. In the case of a subband with a bandwidth of 20 MHz, the interlacing spacing becomes 10 PRBs, and the number of interlacing units in which resource allocation is actually performed is 10. Therefore, the resource allocation may be performed with an N_RA of 10 bits. Alternatively, if the interlacing spacing is 5 PRBs, the number of interlacing units is 20, so that N_RA requires 20 bits. Therefore, since N_RA exceeds the predetermined resource allocation field of 10 bits, interlacing with an interval of 5 PRBs cannot be applied to the corresponding subband.

If the bandwidth is 10 MHz, a total of 50 PRBs may be divided to have a spacing of 5 units. Therefore, ten interlacing units may be generated, and resource allocation may be performed with an N_RA of 10 bits.

The controller 1720 may perform interlacing for the uplink channel on the basis of the interlacing information.

The transmitter 1730 may transmit an uplink channel by applying the interlace.

According to the embodiment, it is possible to provide a method and apparatus capable of transmitting an uplink channel on the basis of interlacing information determined according to subcarrier spacing in an unlicensed band.

Figure 18:
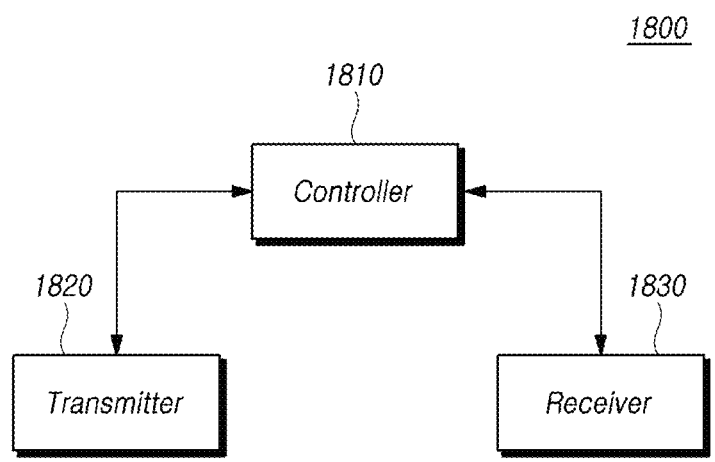
FIG. 18 is a block diagram illustrating a base station according to another embodiment.

FIG. 18 is a block diagram illustrating a base station 1800 according to an embodiment.

Referring to FIG. 18, a base station 1800 includes a control unit 1810, a transmitter 1820, and a receiver 1830.

The controller 1810 controls the overall operations of the base station 1800 for performing a method of receiving an uplink channel in an unlicensed band. The transmitter 1820 and the receiver 1830 are used to transmit and receive signals, messages, or data necessary for carrying out the above-described disclosure to and from a UE.

For example, the receiver 1830 may receive an uplink channel to which interlace was applied in an unlicensed band.

The controller 1810 may acquire information included in the uplink channel on the basis of the interlacing information about the interlace.

For example, the receiver 1830 may receive an uplink channel with the interlace configured in the UE applied. Interlacing spacing in units of PRBs may be configured in the interlaces, and respective interlaces may be repeatedly configured according to the interlacing spacing.

For example, the interlacing information on an interlacing pattern may be determined to be different according to the subcarrier spacing of the unlicensed band. In this case, an interlacing pattern for each subband may be configured in resource allocation for each subband constituting the bandwidth.

For example, the subbands used for the transmission of an uplink channel may be configured to have different bandwidths from each other, and interlacing may be applied differently to the respective subbands. In this case, values for the sizes of the subbands may be taken into consideration when configuring the interlacing pattern. When defining an interlacing pattern for each subband, the size of a subband or the number of PRBs of the subband may be used.

If the subband size is fixed, the interlacing unit may be configured to be different according to the subcarrier spacing of the subband. For example, it is assumed that the bandwidth of the subband is 20 MHz. In the case where the SCSs of the subband are 15 kHz, 30 kHz, and 60 kHz, respectively, the numbers of PRBs of the subband according to respective SCSs are 100, 50, and 25, respectively.

In this case, since the numbers of PRBs defined for the SCS are different between the SCSs, the interlacing spacing and the interlacing unit included in the interlacing information may be configured according thereto. For example, if the SCS is 15 kHz, the interlacing unit may include 10 interlaces with spacing of 10 PRBs. If the SCS is 30 kHz, the interlacing unit may include 5 interlaces with spacing of 10 PRBs. That is, the interlacing information may be configured to be variable depending on the SCS of the subband.

For example, the transmitter 1820 may perform direct signaling of the interlacing information through a DCI. For example, if the UE detects a corresponding PDCCH, the interlacing field, which is a DCI field included in the corresponding grant, may indicate the interlacing unit such as subband #0: 0, subband #1: 1, and the like. That is, it is assumed that the interlacing field value "0" indicates an interval of 10 RBs and the interlacing field value "1" indicates an interval of 5 RBs. In this case, the interlacing unit may be configured as 10 PRBs for subband #0, and the interlacing unit may be configured as 5 PRBs for subband #1.

As another example, transmitter 1820 may perform direct signaling of the interlacing information through RRC signaling. An interlacing pattern value for multiple subbands may be indicated through single RRC signaling, and the specific method thereof may be substantially the same as the method using the DCI described above.

As still another example, the interlacing information may be determined as a value, which is dependent on the size of the subband or BWP. In this case, unlike using the above-described DCI or RRC signaling, the transmitter 1820 does not need to perform signaling separately in order to provide the UE with indication of the interlacing unit. That is, the interlacing unit may be determined in a predefined manner through a value defined at the time of dividing the subband.

In this case, the interlacing unit may be determined to be a predefined size according to the size of the initially divided subband. If the size of the bandwidth for each subband is determined when setting the initial subband, the interlacing spacing satisfying the corresponding range is determined according thereto, and basic interlacing units may also be determined according to the interlacing spacing. For example, if the bandwidth of the subband is determined to be 20 MHz, the interlacing spacing is determined to be 10 PRBs. In this case, since respective interlacing units are determined with a spacing of 10 PRBs for a total of 100 PRBs, the number of interlacing units may be determined to be 10.

As yet another example, the interlacing unit may be determined according to the size of a resource allocation field in the DCI transmitted by the transmitter 1820. In this case, the size of a resource allocation field may be used for performing interlacing. For example, if the number of bits for resource allocation is limited to "N_RA", the interlacing pattern may be determined according thereto. For example, it is assumed that bitmap-based resource allocation is applied in the case where N_RA is 10 bits and the SCS is 15 kHz. In the case of a subband with a bandwidth of 20 MHz, the interlacing spacing becomes 10 PRBs, and the number of interlacing units in which resource allocation is actually performed is 10. Therefore, the resource allocation may be performed with an N_RA of 10 bits. Alternatively, if the interlacing spacing is 5 PRBs, the number of interlacing units is 20, so that N_RA requires 20 bits. Therefore, since N_RA exceeds the predetermined resource allocation field of 10 bits, interlacing with an interval of 5 PRBs cannot be applied to the corresponding subband.

If the bandwidth is 10 MHz, a total of 50 PRBs may be divided to have a spacing of 5 units. Therefore, ten interlacing units may be generated, and resource allocation may be performed with an N_RA of 10 bits.

On the basis of the interlacing information, the receiver 1830 may obtain information from the uplink channel to which the interlacing was applied.

According to the embodiment, a method and apparatus may be provided for receiving an uplink channel on the basis of interlacing information determined according to subcarrier spacing in the unlicensed band.

The embodiments described above may be supported by the standard documents disclosed in at least one of the radio access systems such as IEEE 802, 3GPP, and 3GPP2. That is, the steps, configurations, and parts, which have not been described in the embodiments, may be supported by the standard documents for clarifying the technical concept of the disclosure. In addition, all terms disclosed herein may be described by the standard documents set forth above.

The above-described embodiments may be implemented by any of various means. For example, the embodiments may be implemented as hardware, firmware, software, or a combination thereof.

In the case of implementation by hardware, the method according to the embodiments may be implemented as at least one of an application specific integrated circuit (ASIC), a digital signal processor (DSP), a digital signal processing device (DSPD), a programmable logic device (PLD), a field programmable gate array (FPGA), a processor, a controller, a microcontroller, or a microprocessor.

In the case of implementation by firmware or software, the method according to the embodiments may be implemented in the form of an apparatus, a procedure, or a function for performing the functions or operations described above. Software code may be stored in a memory unit, and may be driven by the processor. The memory unit may be provided inside or outside the processor, and may exchange data with the processor by any of various well-known means.

In addition, the terms "system", "processor", "controller", "component", "module", "interface", "model", "unit", and the like may generally mean computer-related entity hardware, a combination of hardware and software, software, or running software. For example, the above-described components may be, but are not limited to, a process driven by a processor, a processor, a controller, a control processor, an entity, an execution thread, a program and/or a computer. For example, both the application that is running in a controller or a processor and the controller or the processor may be components. One or more components may be provided in a process and/or an execution thread, and the components may be provided in a single device (e.g., a system, a computing device, etc.), or may be distributed over two or more devices.

The above embodiments of the present disclosure have been described only for illustrative purposes, and those skilled in the art will appreciate that various modifications and changes may be made thereto without departing from the scope and spirit of the disclosure. Further, the embodiments of the disclosure are not intended to limit, but are intended to illustrate the technical idea of the disclosure, and therefore the scope of the technical idea of the disclosure is not limited by these embodiments. The scope of the present disclosure shall be construed on the basis of the accompanying claims in such a manner that all of the technical ideas included within the scope equivalent to the claims belong to the present disclosure.

What is claimed is:

1. A method for transmitting an uplink channel by a User Equipment (UE) in an unlicensed band, the method comprising:
determining, by the UE, interlacing information according to subcarrier spacing (SCS) of an unlicensed band;
configuring, by the UE, an interlace for an uplink channel based on the determined interlacing information; and
transmitting the uplink channel by applying the interlace.

2. The method of claim 1, wherein the interlacing information comprises at least one of a number of interlaces and a number of physical resource blocks (PRBs) for each interlace.

3. The method of claim 2, wherein, if the subcarrier spacing is 15 kHz, the number of interlaces of the interlacing information is 10, and the number of physical resource blocks for each interlace thereof is 10.

4. The method of claim 2, wherein, if the subcarrier spacing is 30 kHz, the number of interlaces of the interlacing information is 5, and the number of physical resource blocks for each interlace thereof is 10.

5. The method of claim 1, wherein at least one of a number of interlaces or a number of physical resource blocks for each interlace in the interlacing information is determined based on a bandwidth in which the uplink channel is transmitted.

6. A method of receiving an uplink channel by a base station in an unlicensed band, the method comprising:
- receiving an uplink channel with an interlace applied in an unlicensed band from a user equipment (UE); and
- obtaining information included in the uplink channel,
- wherein the interlace applied in the unlicensed band is configured by the UE based on interlacing information, and the interlacing information is determined by the UE according to a subcarrier spacing (SCS) of the unlicensed band.

7. The method of claim 6, wherein the interlacing information comprises at least one of a number of interlaces and a number of physical resource blocks (PRBs) for each interlace.

8. The method of claim 7, wherein, if the subcarrier spacing is 15 kHz, the number of interlaces of the interlacing information is 10, and the number of physical resource blocks for each interlace thereof is 10.

9. The method of claim 7, wherein, if the subcarrier spacing is 30 kHz, the number of interlaces of the interlacing information is 5, and the number of physical resource blocks for each interlace thereof is 10.

10. The method of claim 6, wherein at least one of a number of interlaces and a number of physical resource blocks for each interlace in the interlacing information is determined based on a bandwidth in which the uplink channel is transmitted.

11. A User Equipment (UE) for transmitting an uplink channel in an unlicensed band, the UE comprising:
- a controller configured to determine interlacing information according to subcarrier spacing (SCS) of an unlicensed band and configure an interlace for an uplink channel based on the determined interlacing information; and
- a transmitter configured to transmit the uplink channel by applying the interlace.

12. The UE of claim 11, wherein the interlacing information comprises at least one of a number of interlaces and a number of physical resource blocks (PRBs) for each interlace.

13. The UE of claim 12, wherein, if the subcarrier spacing is 15 kHz, the number of interlaces of the interlacing information is 10, and the number of physical resource blocks for each interlace thereof is 10.

14. The UE of claim 12, wherein, if the subcarrier spacing is 30 kHz, the number of interlaces of the interlacing information is 5, and the number of physical resource blocks for each interlace thereof is 10.

15. The UE of claim 11, wherein at least one of a number of interlaces and a number of physical resource blocks for each interlace in the interlacing information is determined based on a bandwidth in which the uplink channel is transmitted.

* * * * *